(12) United States Patent
Oba et al.

(10) Patent No.: US 8,036,176 B2
(45) Date of Patent: Oct. 11, 2011

(54) MIH PRE-AUTHENTICATION

(75) Inventors: Yoshihiro Oba, Englewood Cliffs, NJ (US); Subir Das, Belle Mead, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 641 days.

(21) Appl. No.: 12/135,194

(22) Filed: Jun. 8, 2008

(65) Prior Publication Data

US 2008/0310366 A1 Dec. 18, 2008

Related U.S. Application Data

(60) Provisional application No. 60/942,880, filed on Jun. 8, 2007.

(51) Int. Cl.
*H04Q 7/00* (2006.01)
(52) U.S. Cl. ........................................ 370/331; 455/436
(58) Field of Classification Search .................. 370/331, 370/349, 310.2, 328, 338; 455/436, 439, 455/442
See application file for complete search history.

(56) References Cited

U.S. PATENT DOCUMENTS

| | | | | |
|---|---|---|---|---|
| 7,738,882 B2 * | 6/2010 | Dutta et al. | ................. | 455/456.1 |
| 2007/0110075 A1 * | 5/2007 | Olvera-Hernandez | ... | 370/395.52 |
| 2007/0265008 A1 * | 11/2007 | Feder et al. | .................... | 455/436 |

OTHER PUBLICATIONS

C. Perkins, IP Mobility Support for IPv4, Aug. 2002, p. 1-98, The Internet Society, USA.
D. Johnson, Mobility Support in IPv6, Jun. 3, 2008, p. 1-161, Internet Draft, USA.
K. El Malki, Low-Latency Handoffs in Mobile IPv4, Jun. 2007, p. 1-60, The IETF Trust, USA.
R. Koodli, Fast Handovers for Mobile IPv6, Jul. 2005, p. 1-40, The Internet Society, USA.
M. Liesbsch, Candidate Access Router Discovery, Jul. 2005, p. 1-46, The Internet Society, USA.
J. Bournelle, Use of Context Transfer Protocol for PANA, Jun. 24, 2005, p. 1-20, Internet Draft, USA.
B. Aboba, Extensible Authentication Protocol Key Management Framework, Nov. 11, 2007, p. 1-73, Internet Draft, USA.
P. Jayaram, Protocol for Carrying Authentication for Network Access Framework, May 2008, p. 1-12, USA.
S. Park, Rapid Commit Option for DHCPv4, Apr. 19, 2004, p. 1-11, Internet Draft, USA.
ITU-T G.107 AMD 1 The E-model, a computational model for use in transmission planning Amendment 1: New Appendix II—Provisional impairment factor framework for wideband speech transmission, Jun. 1, 2006, p. 1, USA.
T. Kivinen, Design of the IKEv2 Mobility and Mulithoming Protocol, Aug. 2006, p. 1-29, The Internet Society, USA.
R. Moskowitz, Host Identity Protocol, May 15, 2003, p. 1-53, Internet Draft, USA.
G. Almes, A One-way Delay Metric for IPPM, Sep. 1999, p. 1-19, The Internet Society, USA.
G. Almes, A One-way Packet Loss Metric for IPPM, Sep. 1999, p. 1-15, The Internet Society, USA.
G. Almes, A Round Trip Delay Metric for IPPM, Sep. 1999, p. 1-19, The Internet Society, USA.

(Continued)

*Primary Examiner* — Brenda H Pham
(74) *Attorney, Agent, or Firm* — Westerman, Hattori, Daniels & Adrian, LLP

(57) ABSTRACT

A system and method for performing MIH pre-authentication, which includes providing support for both direct and/or indirect pre-authentication and providing support for both network-initiated and mobile-initiated pre-authentication.

21 Claims, 15 Drawing Sheets

OTHER PUBLICATIONS

W. Simpson, IP in IP Tunneling, Oct. 1995, p. 1-8, The Internet Society, USA.
M. Patrick, DHCP Relay Agent Information Option, Jan. 2001, p. 1-14, The Internet Society, USA.
H. Schulzrinne, Application Layer Mobility Using SIP, p. 1-13, vol. 1, No. 2, USA.
A. Yegin, Supporting Optimized Handover for IP Mobility—Requirements for Underlying Systems, Jun. 2002, p. 1-12, Internet Draft, USA.
A. T. Campbell, Design, Implementation, and Evaluation of Cellular IP, Aug. 2000, p. 42-49, vol. 7, Issue 4, USA.
R. Ramjee, Hawaii: A Domain based Approach for Supporting Mobility in Wide-area Wireless Networks, p. 1-16, USA.
S. Das, IDMP: An Intra-Domain Mobility Management Protocol for Next Generation Wireless Networks, p. 1-11, USA.
E. Gustafsson, Mobile IPv4 Regional Registration, Nov. 22, 2004, p. 1-40, Internet Draft, USA.
H. Yokota, Link Layer Assisted Mobile IP Fast Handoff Method Over Wireless LAN Networks, 2002, p. 131-139, USA.
S. Shin, Reducing MAC Layer Handoff Latency in IEEE 802.11 Wireless LANs, 2004, p. 19-26, Session 1, ACM, USA.
A. Dutta, Fast-Handoff Schemes for Application Layer Mobility Management, p. 2-5, USA.
Y. Gwon, Fast Handoffs in Wireless LAN Networks Using Mobile Initiated Tunnel Handoff Protocol for IPv4, Mar. 20, 2003, p. 1248-1253, vol. 2, USA.
A. Dutta, GPS-IP based Fast-Handoff for Mobiles, p. 1-3, USA.
M. Nakhjiri, "Handover Security in a Heterogeneous Access Environment", IETF HOKEY—IEEE 802.21 Integration, IEEE 802.21 Media Independent Handover, Mar. 15, 2007, pp. 1-14.
Y. El Mghazli, "MPA Using IKEv2 and Mobike", Jun. 8, 2006, p. 1-17, The Internet Society, USA.
Y. Ohba, "EAP Pre-authentication Problem Statement", Mar. 3, 2007, p. 1-15, The IETF Trust, USA.
M. Nakhjiri, "A Keying Hierarchy for Managing Wireless Handover Security", Jan. 15, 2007, p. 1-26, The IETF Trust, USA.
International Search Report, Dec. 29, 2008, pp. 1-6.
J. Loughney, "Context Transfer Protocol", Internet-Draft, Aug. 2004, p. 1-33, The Internet Society, USA.
D. Forsberg, "Protocol for Carrying Authentication for Network Access (PANA)", Internet-Draft, Dec. 2004, p. 1-76, The Internet Society, USA.
S. Park, "Rapid Commit Option for DHCPv4", Internet-Draft, Jun. 2004, p. 1-12, The Internet Society, USA.
T. Kivinen, "Design of the MOBIKE protocol," Internet-Draft, Jan. 2005, p. 1-35, The Internet Society, USA.
Chinese Office Action dated Jun. 15, 2011, issued in corresponding Chinese Patent Application No. 200880000529.6.
IEEE 802.21 Media Independent Handover Plenary Session; DCN:21-07-0127-00-000 "Handover Security in a Heterogeneous Access Environment IETF HOKEY-IEEE 802.21 Ingtegration", Mar. 15, 2007; Orlando, Florida.

* cited by examiner

FIG. 4 Pre-authentication Signaling Flows
Direct Pre-authentication
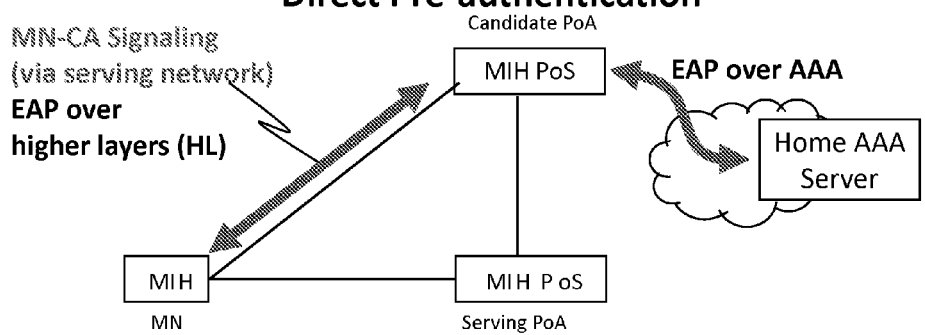
Indirect Pre-authentication
FIG. 5
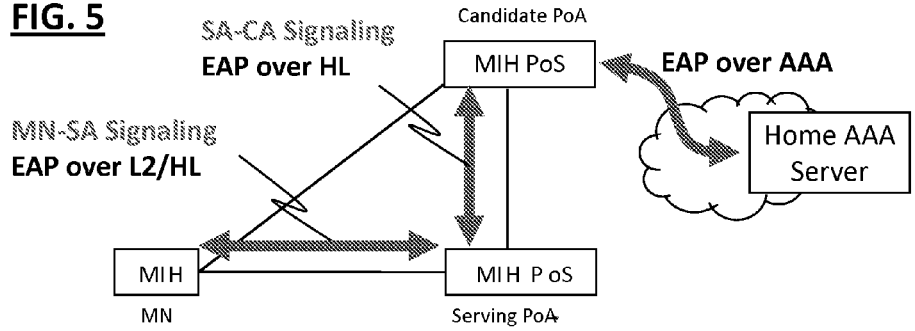

LOGICAL NETWORK REFERENCE MODEL

MIHF COMMUNICATION MODEL

Source Identifier, Destination Identifier and SID are not shown in the diagram
SID is assigned by CA Source Identifier, Destination Identifier and SID are not shown in the diagram Network-initiated
Indirect Pre-authentication Source Identifier, Destination Identifier and SID are not shown in the diagram
SID is assigned by SA for messages between MN and SA and
by CA for messages between SA and CA Source Identifier, Destination Identifier and SID are not shown in the diagram Source Identifier, Destination Identifier and SID are not shown in the diagram Source Identifier, Destination Identifier and SID are not shown in the diagram

MIH PRE-AUTHENTICATION

PRIORITY CLAIM

The present application claims priority to and is a non-provisional conversion of U.S. Provisional Application Ser. No. 60/942,880 of Y. Ohba, et al., filed on Jun. 8, 2007, the entire disclosure of which is incorporated herein by reference as though recited herein in full.

BACKGROUND

1. Field of the Invention

The present application relates to authentication and handover of mobile nodes between wireless networks.

2. Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier. IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. The layers of the OSI model are listed below. Layer 7 (i.e., the application layer) is a layer at which, e.g., communication partners are identified, quality of service is identified, user authentication and privacy are considered, constraints on data syntax are identified, etc. Layer 6 (i.e., the presentation layer) is a layer that, e.g., converts incoming and outgoing data from one presentation format to another, etc. Layer 5 (i.e., the session layer) is a layer that, e.g., sets up, coordinates, and terminates conversations, exchanges and dialogs between the applications, etc. Layer-4 (i.e., the transport layer) is a layer that, e.g., manages end-to-end control and error-checking, etc. Layer-3 (i.e., the network layer) is a layer that, e.g., handles routing and forwarding, etc. Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery. Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Wireless Networks:

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (e.g., outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

For general background reference, each of which references listed below is incorporated herein by reference in its entirety:

1. Perkins, C., "IP Mobility Support for IPv4", RFC 3344, August 2002. Referred to herein as [RFC3344].
2. Johnson, D., Perkins, C. and J. Arkko, "Mobility Support in IPv6", RFC 3775, June 2004. Referred to herein as [RFC3775].
3. Malki, K., "Low latency Handoffs in Mobile IPv4", draft-ietf-mobileip-lowlatency-handoffs-v4-09 (work in progress), June 2004. Referred to herein as [I-D.ieff-mobileip-lowlatency-handoffs-v4].
4. Koodli, R., "Fast Handovers for Mobile IPv6", draft-ietf-mipshop-fast-mipv6-03 (work in progress), October 2004. Referred to herein as [I-D.ietf-mipshop-fast-mipv6].
5. Liebsch, M., "Candidate Access Router Discovery", draft-ietf-seamoby-card-protocol-08 (work in progress), September 2004. Referred to herein as [I-D.ietf-seamoby-card-protocol].
6. Loughney, J., "Context Transfer Protocol", draft-ietf-seamoby-ctp-11 (work in progress), August 2004. Referred to herein as [I-D.ieff-seamoby-ctp].
7. Aboba, B., "Extensible Authentication Protocol (EAP) Key Management Framework", draft-ieff-eap-keying-04 (work in progress), November 2004. Referred to herein as [I-D.ietf-eap-keying].
8. Forsberg, D., Ohba, Y., Patil, B., Tschofenig, H. and A. Yegin, "Protocol for Carrying Authentication for Network Access (PANA)", draft-ietf-pana-pana-07 (work in progress), December 2004. Referred to herein as [I-D.ietf-pana-pana].
9. Kim, P., Volz, B. and S. Park, "Rapid Commit Option for DHCPv4", draft-ietf-dhc-rapid-commit-opt-05 (work in progress), June 2004. Referred to herein as [I-D.ietf-dhc-rapid-commit-opt].
10. ITU-T, "General Characteristics of International Telephone Connections and International Telephone Cirsuits: One-Way Transmission Time." Referred to herein as [RG98].
11. ITU-T, "The E-Model, a computational model for use in transmission planning." Referred to herein as [ITU98].
12. ETSI, "Telecommunications and Internet Protocol Harmonization Over Networks (TIPHON) Release 3: End-to-end Quality of Service in TIPHON systems; Part 1: General Aspects of Quality of Service." Referred to herein as [ETSI].
13. Kivinen, T. and H. Tschofenig, "Design of the MOBIKE protocol," draft-ieff-mobike-design-01 (work in progress), January 2005. Referred to herein as [I-D.ietf-mobike-design].
14. Moskowitz, R., "Host Identity Protocol", draft-ietf-hip-base-01 (work in progress), October 2004. Referred to herein as [I-D.ietf-hip-base].
15. Almes, G., Kalidindi, S. and M. Zekauskas, "A One-way Delay Metric for IPPM", RFC 2679, September 1999. Referred to herein as [RFC2679].

16. Almes, G., Kalidindi, S. and M. Zekauskas, "A One-way Packet Loss Metric for IPPM", RFC 2680, September 1999. Referred to herein as [RFC2680].
17. Almes, G., Kalidindi, S. and M. Zekauskas, "A Round-trip Delay Metric for IPPM", RFC 2681, September 1999. Referred to herein as [RFC2681].
18. Simpson, W., "IP in IP Tunneling", RFC 1853, October 1995. Referred to herein as [RFC1853].
19. Patrick, M., "DHCP Relay Agent Information Option", RFC 3046, January 2001. Referred to herein as [RFC3046].
20. Schulzrine, H., "Application Layer Mobility Using SIP." Referred to herein as [SIPMM].
21. Yegin, A., "Supporting Optimized Handover for IP Mobility—Requirements for Underlying Systems", draft-many-folks-l2-mobilereq-02 (work in progress), July 2002. Referred to herein as [I-D.manyfolks-l2-mobilereq].
22. Cambell, A., Gomez, J., Kim, S., Valko, A. and C. Wan, "Design, Implementation, and Evaluation of Cellular IP." Referred to herein as [CELLIP].
23. Ramjee, R., Porta, T., Thuel, S., Varadhan, K. and S. Wang, "HAWAII: A Domain-based Approach for Supporting Mobility in Wide-area Wireless networks." Referred to herein as [HAWAII].
24. Das, S., Dutta, A., Misra, A. and S. Das, "IDMP: An Intra-Domain Mobility Management Protocol for Next Generation Wireless Networks." Referred to herein as [IDMP].
25. Calhoun, P., Montenegro, G., Perkins, C. and E. Gustafsson, "Mobile IPv4 Regional Registration", draft-ietf-mobileip-reg-tunnel-09 (work in progress), July 2004. Referred to herein as [I-D.ieff-mobileip-reg-tunnel].
26. Yokota, H., Idoue, A. and T. Hasegawa, "Link Layer Assisted Mobile IP Fast Handoff Method over Wireless LAN Networks." Referred to herein as [YOKOTA].
27. Shin, S., "Reducing MAC Layer Handoff Latency in IEEE 802.11 Wireless LANs." Referred to herein as [MACD].
28. Dutta, A., "Secured Universal Mobility." Referred to herein as [SUM].
29. Dutta, A., "Fast handoff Schemes for Application Layer Mobility Management." Referred to herein as [SIPFAST].
30. Gwon, Y., Fu, G. and R. Jain, "Fast Handoffs in Wireless LAN Networks using Mobile initiated Tunneling Handoff Protocol for IPv4 (MITHv4)", January 2005. Referred to herein as [MITH].
31. Anjum, F., Das, S., Dutta, A., Fajardo, V., Madhani, S., Ohba, Y., Taniuchi, K., Yaqub, R. and T. Zhang, "A proposal for MIH function and Information Service", January 2005. Referred to herein as [NETDISC].
32. Dutta, A., "GPS-IP based fast-handoff for Mobiles." Referred to herein as [GPSIP].
33. [MAGUIRE] Vatn, "The effect of using co-located care-of-address on macro handover latency."

Background Regarding Framework of Media Independent Pre-Authentication:

The present entire disclosures of the following U.S. Applications are incorporated herein by reference in their entireties: U.S. patent application Ser. No. 11/307,362 to A. Dutta, et al. for A Framework of Media-Independent Pre-Authentication; U.S. patent application Ser. No. 11/308,175 to Y. Ohba for A Framework of Media-Independent Pre-Authentication (Support for PANA). This section also includes some contents of said U.S. application Ser. No. 11/307,362 below for reference.

1. Introduction

As wireless technologies including cellular and wireless LAN are popularly used, supporting terminal handovers across different types of access networks, such as from a wireless LAN to CDMA or to GPRS is considered as a clear challenge. On the other hand, supporting terminal handovers between access networks of the same type is still challenging, especially when the handovers are across IP subnets or administrative domains. To address those challenges, it is important to provide terminal mobility that is agnostic to link-layer technologies in an optimized and secure fashion without incurring unreasonable complexity. In this document we discuss terminal mobility that provide seamless handovers with low-latency and low-loss. Seamless handovers are characterized in terms of performance requirements.

The basic part of terminal mobility is accomplished by a mobility management protocol that maintains a binding between a locator and an identifier of a mobile terminal, where the binding is referred to as the mobility binding. The locator of the mobile node may dynamically change when there is a movement of the mobile terminal. The movement that causes a change of the locator may occur not only physically but also logically. A mobility management protocol may be defined at any layer. In the rest of this document, the term "mobility management protocol" refers to a mobility management protocol which operates at network layer or higher.

There are several mobility management protocols at different layers. Mobile IP [RFC3344] and Mobile IPv6 [RFC3775] are mobility management protocols that operate at network-layer. There are several ongoing activities in the IETF to define mobility management protocols at layers higher than network layer. For example, MOBIKE (IKEv2 Mobility and Multihoming) [I-D.ieff-mobike-design] is an extension to IKEv2 that provides the ability to deal with a change of an IP address of an IKEv2 end-point. HIP (the Host Identity Protocol) [I-D.ietf-hip-base] defines a new protocol layer between network layer and transport layer to provide terminal mobility in a way that is transparent to both network layer and transport layer. Also, SIP-Mobility is an extension to SIP to maintain the mobility binding of a SIP user agent [SIPMM].

While mobility management protocols maintain mobility bindings, using them solely in their current form is not sufficient to provide seamless handovers. An additional optimization mechanism that works in the visited network of the mobile terminal to prevent loss of outstanding packets transmitted while updating the mobility binding is needed to achieve seamless handovers. Such a mechanism is referred to as a mobility optimization mechanism. For example, mobility optimization mechanisms [I-D.ietf-mobileip-lowlatency-handoffs-v4] and [I-D.ietf-mipshop-fast-mipv6] are defined for Mobile IPv4 and Mobile IPv6, respectively, by allowing neighboring access routers to communicate to carry information on mobile terminals. There are protocols that are considered as "helpers" of mobility optimization mechanisms. The CARD (Candidate Access Router Discovery Mechanism) protocol [I-D.ietf-seamoby-card-protocol] is designed to discover neighboring access routers. The CTP (Context Transfer Protocol) [I-D.ieff-seamoby-ctp] is designed to carry state that is associated with the services provided for the mobile terminal, or context, among access routers.

There are several issues in existing mobility optimization mechanisms. First, existing mobility optimization mechanisms are tightly coupled with specific mobility management protocols. For example, it is not possible to use mobility optimization mechanisms designed for Mobile IPv4 or Mobile IPv6 for MOBIKE. What is strongly desired is a single, unified mobility optimization mechanism that works with any mobility management protocol. Second, there is no existing mobility optimization mechanism that easily supports handovers across administrative domains without assuming a pre-established security association between administrative domains. A mobility optimization mechanism should work across administrative domains in a secure manner only based on a trust relationship between a mobile node and each administrative domain. Third, a mobility optimization mechanism needs to support not only multi-interface terminals where multiple simultaneous connectivity through multiple interfaces can be expected, but also single-interface terminals.

This document describes a framework of Media-independent Pre-Authentication (MPA), a new handover optimization mechanism that has a potential to address all those issues. MPA is a mobile-assisted, secure handover optimization scheme that works over any link-layer and with any mobility management protocol including Mobile IPv4, Mobile IPv6, MOBIKE, HIP, SIP mobility, etc. In MPA, the notion of IEEE 802.111 pre-authentication is extended to work at higher layer, with additional mechanisms to perform early acquisition of IP address from a network where the mobile terminal may move as well as proactive handover to the network while the mobile terminal is still attached to the current network.

Here, systems and methods are described to proactively establish higher layer and lower layer contexts of different media. In this regard, media includes, e.g., the available networks accessible to mobile devices (e.g., wired, wireless licensed, wireless unlicensed, etc.). See, e.g., media discussed in I.E.E.E. 802, including I.E.E.E. 802.21. Media may include, e.g., wireless LAN (e.g., I.E.E.E. 802.11), I.E.E.E. 802.16, I.E.E.E. 802.20, Bluetooth, etc. Some illustrative examples include: 1) a mobile device switching from a cellular network to a wireless or WIFI network, such as, e.g., a cell phone with cellular interface and wireless interface trying to get WIFI access by obtaining information (e.g., keys, etc.) initially over the cellular network, rather than simultaneously establishing a wireless interface; 2) where a mobile device currently has wireless or WIFI connectivity, where the wireless LAN may potentially shut down quickly or the like, in which case, by way of example, the mobile device can proactively do pre-authentication via cellular network (i.e., so as to enable a quick switch if needed). In some illustrative cases, a mobile node with a single IEEE 802.xx interface may roam among multiple subnets and multiple administrative domains. While keeping multiple interfaces always-on is an option, a mobile node may want to deactivate unused interfaces in some instances (such as, e.g., to save power, etc.). In addition, MPA can provide, among other things, secure and seamless mobility optimization that works for inter-subnet handoff, inter-domain handoff, inter-technology handoff, etc., as well as the use of multiple interfaces.

2. Terminology

Mobility Binding:

A binding between a locator and an identifier of a mobile terminal. Mobility Management Protocol (MMP): A protocol that operates at network layer or higher to maintain a binding between a locator and an identifier of a mobile terminal.

Binding Update:

A procedure to update a mobility binding.

Media-Independent Pre-Authentication Mobile Node (MN):

A mobile terminal of media-independent pre-authentication (MPA) which is a mobile-assisted, secure handover optimization scheme that works over any link-layer and with any mobility management protocol. An MPA mobile node is an IP node. In this document, the term "mobile node" or "MN" without a modifier refers to "MPA mobile node." An MPA mobile node usually has a functionality of a mobile node of a mobility management protocol as well.

Candidate Target Network (CTN):

A network to which the mobile may move in the near future.

Target Network (TN):

The network to which the mobile has decided to move. The target network is selected from one or more candidate target network.

Proactive Handover Tunnel (PHT):

A bidirectional IP tunnel that is established between the MPA mobile node and an access router of the candidate target network. In this document, the term "tunnel" without a modifier refers to "proactive handover tunnel."

Point of Attachment (PoA):

A link-layer device (e.g., a switch, an access point or a base station, etc.) that functions as a link-layer attachment point for the MPA mobile node to a network.

Care-of Address (CoA):

An IP address used by a mobility management protocol as a locator of the MPA mobile node.

3. MPA Framework 3.1 Overview

Media-independent Pre-Authentication (MPA) is a mobile-assisted, secure handover optimization scheme that works over any link-layer and with any mobility management protocol. With MPA, a mobile node is not only able to securely obtain an IP address and other configuration parameters from a candidate target network, but also able to send and receive IP packets using the obtained IP address and other configuration parameters, before it attaches to the candidate target network when the candidate target network becomes the target network. This makes it possible for the mobile node to complete the binding update of any mobility management protocol and use the new care-of address before performing a handover at link-layer.

This functionality is provided by allowing a mobile node, which has a connectivity to the current network but is not yet attached to a candidate target network, to (i) establish a security association with the candidate target network to secure the subsequent protocol executions, then (ii) securely execute a configuration protocol to obtain an IP address and other configuration parameters from the candidate target network as well as a tunnel management protocol to establish a bidirectional tunnel between the mobile node and an access router of the candidate target network, then (iii) send and receive IP packets, including signaling messages for binding update of a mobility management protocol and data packets transmitted after completion of binding update, over the tunnel using the obtained IP address as the tunnel inner address, and finally (iv) deleting or disabling the tunnel immediately before attaching to the candidate target network when it becomes the target network and then re-assigning the inner address of the deleted or disabled tunnel to its physical interface immediately after the mobile node is attached to the target network through the interface. Instead of deleting or disabling the tunnel before attaching to the target network, the tunnel may be deleted or disabled immediately after attached to the target network.

Especially, the third procedure makes it possible for the mobile to complete higher-layer handover before starting link-layer handover. This means that the mobile is able to send and receive data packets transmitted after completion of binding update over the tunnel, while it is still able to send and receive data packets transmitted before completion of binding update outside the tunnel.

In the above four basic procedures of MPA, the first procedure is referred to as "pre-authentication", the second procedure is referred to as "pre-configuration", the combination of the third and fourth procedures are referred to as "secure proactive handover." The security association established through pre-authentication is referred to as an "MPA-SA." The tunnel established through pre-configuration is referred to as a "proactive handover tunnel."

3.2 Functional Elements

In the MPA framework, the following functional elements are expected to reside in each candidate target network to communicate with a mobile node: Authentication Agent (AA), Configuration Agent (CA) and Access Router (AR). Some or all of those elements can be placed in a single network device or in separate network devices.

An authentication agent is responsible for pre-authentication. An authentication protocol is executed between the mobile node and the authentication agent to establish an MPA-SA. The authentication protocol must be able to derive a key between the mobile node and the authentication agent, should be able to provide mutual authentication. The authentication protocol should be able to interact with a AAA protocol such as RADIUS and Diameter to carry authentication credentials to an appropriate authentication server in the AAA infrastructure. The derived key is used for further deriving keys used for protecting message exchanges used for pre-configuration and secure proactive handover. Other keys that are used for bootstrapping link-layer and/or network-layer ciphers may also be derived from the MPA-SA.

A configuration agent is responsible for one part of pre-configuration, namely securely executing a configuration protocol to securely deliver an IP address and other configuration parameters to the mobile node. The signaling messages of the configuration protocol needs to be protected using a key derived from the key corresponding to the MPA-SA.

An access router is a router that is responsible for the other part of pre-configuration, i.e., securely executing a tunnel management protocol to establish a proactive handover tunnel to the mobile node, and secure proactive handover using the proactive handover tunnel. The signaling messages of the configuration protocol must be protected using a key derived from the key corresponding to the MPA-SA. IP packets transmitted over the proactive handover tunnel should be protected using a key derived from the key corresponding to the MPA-SA.

3.3 Basic Communication Flow

Assume that the mobile node is already connected to a point of attachment, say oPoA (old point of attachment), and assigned a care-of address, say oCoA (old care-of address). The communication flow of MPA is described as follows. Throughout the communication flow, data packet loss should not occur except for the period during the switching procedure in Step 5, and it is the responsibility of link-layer handover to minimize packet loss during this period.

Step 1 (pre-authentication phase): The mobile node finds a candidate target network through some discovery process and obtains the IP addresses, an authentication agent, a configuration agent and an access router in the candidate target network by some means. The mobile node performs pre-authentication with the authentication agent. If the pre-authentication is successful, an MPA-SA is created between the mobile node and the authentication agent. Two keys are derived from the MPA-SA, namely an MN-CA key and an MN-AR key, which are used to protect subsequent signaling messages of a configuration protocol and a tunnel management protocol, respectively. The MN-CA key and the MN-AR key are then securely delivered to the configuration agent and the access router, respectively.

Step 2 (pre-configuration phase): The mobile node realizes that its point of attachment is likely to change from oPoA to a new one, say nPoA (new point of attachment). It then performs pre-configuration, with the configuration agent using the configuration protocol to obtain an IP address, say nCoA (new care-of address), and other configuration parameters from the candidate target network, and with the access router using the tunnel management protocol to establish a proactive handover tunnel. In the tunnel management protocol, the mobile node registers oCoA and nCoA as the tunnel outer address and the tunnel inner address, respectively. The signaling messages of the pre-configuration protocol are protected using the MN-CA key and the MN-AR key. When the configuration and the access router are co-located in the same device, the two protocols may be integrated into a single protocol like IKEv2. After completion of the tunnel establishment, the mobile node is able to communicate using both oCoA and nCoA by the end of Step 4.

Step 3 (secure proactive handover main phase): The mobile node determines to switch to the new point of attachment by some means. Before the mobile node switches to the new point of attachment, it starts secure proactive handover by executing binding update of a mobility management protocol and transmitting subsequent data traffic over the tunnel (main phase).

Step 4 (secure proactive handover pre-switching phase): The mobile node completes binding update and becomes ready to switch to the new point of attachment point. The mobile executes the tunnel management protocol to delete the proactive handover tunnel. The mobile node caches nCoA even after deletion of the tunnel. The decision as to when the mobile node is ready to switch to the new point of attachment depends on handover policy.

Step 5 (switching): It is expected that a link-layer handover occurs in this step.

Step 6 (secure proactive handover post-switching phase): The mobile node executes the switching procedure. Upon successful completion of the switching procedure, the mobile node immediately restores the cached nCoA and assigns it to the physical interface attached to the new point of attachment. After this, direct transmission of data packets using nCoA is possible without using a proactive handover tunnel.

4. Details

In order to provide an optimized handover for a mobile experiencing rapid subnet and domain handover, one needs to look into several issues. These issues include discovery of neighboring networking elements, choosing the right network to connect to based on certain policy, changing the layer 2 point of attachment, obtaining an IP address from a DHCP or PPP server, confirming the uniqueness of the IP address, pre-authenticating with the authentication agent such as AAA server in a specific domain, sending the binding update to the correspondent host and obtaining the redirected streaming traffic to the new point of attachment. We describe these issues in details in the following paragraphs and describe how these can be optimized in the case of MPA-based secure proactive handover.

5.1 Discovery

Discovery of neighboring networking elements such as access points, access routers, authentication servers help expedite the handover process during a mobile's rapid movement between networks. By discovering the network neighborhood with a desired set of coordinates, capabilities and parameters the mobile can perform many of the operation such as pre-authentication, proactive IP address acquisition, proactive address resolution, and binding update while in the previous network.

There are several ways a mobile can discover the neighboring networks. The Candidate Access Router Discovery protocol [I-D.ietf-seamoby-card-protocol] helps discover the candidate access routers in the neighboring networks. Given a certain network domain SLP and DNS help provide address of the networking components for a given set of services in the specific domain. In some cases many of the network layer and upper layer parameters may be sent over link-layer management frames such as beacons when the mobile approaches the vicinity of the neighboring networks. IEEE 802.11u is considering issues such as discovering neighborhood using information contained in link-layer. However, if the link-layer management frames are encrypted by some link-layer security mechanism, then the mobile node may not able to obtain the requisite information before establishing link-layer connectivity to the access point. In addition this may add burden to the bandwidth constrainted wireless medium. In such cases a higher layer protocol is preferred to obtain the information regarding the neighboring elements. There is some proposal such as [NETDISC] that helps obtain these information about the neighboring networks from a mobility server. When the mobile's movement is imminent, it starts the discovery process by querying a specific server and obtains the required parameters such as the IP address of the access point, its characteristics, routers, SIP servers or authentication servers of the neighboring networks. In the event of multiple networks, it may obtain the required parameters from more than one neighboring networks and keep these in cache. At some point the mobile finds out several candidate target networks out of many probable networks and starts the pre-authentication process by communicating with the required entities in the candidate target networks.

4.2 Proactive IP Address Acquisition

In general, a mobility management protocol works in conjunction with Foreign Agent or in co-located address mode. In the preferred embodiments, the present MPA approach can use both co-located address mode and foreign agent address mode. We discuss here the address assignment component that is used in co-located address mode. There are several ways a mobile node can obtain an IP address and configure itself. Most commonly a mobile can configure itself statically in the absence of any configuring element such as a server or router in the network. The IETF Zeroconf working group defines auto-IP mechanism where a mobile is configured in an adhoc manner and picks a unique address from a specified range such as 169.254.x.x. In a LAN environment the mobile can obtain IP address from DHCP servers. In case of IPv6 networks, a mobile has the option of obtaining the IP address using stateless auto-configuration as well. In a wide area networking environment, a mobile uses PPP to obtain the IP address by communicating with a NAS.

Each of these processes takes on the order of a few hundred mili-seconds to few seconds depending upon the type of IP address acquisition process and operating system of the clients and servers. Since IP address acquisition is part of the handover process, it adds to the handover delay and thus it is desirable to reduce this timing as much as possible. There are few optimized techniques such as DHCP Rapid Commit [I-D.ietf-dhc-rapid-commit-opt], GPS-coordinate based IP address [GPSIP] available that attempt to reduce the handover time due to IP address acquisition time. However in all these cases the mobile also obtains the IP address after it moves to the new subnet and incurs some delay because of the signaling handshake between the mobile node and the DHCP server.

In the following paragraphs, a few ways a mobile node can obtain the IP address proactively from the candidate target network and the associated tunnel setup procedure are described. These can broadly be defined into three categories such as PANA-assisted proactive IP address acquisition, IKE-assisted proactive IP address acquisition and proactive IP address acquisition using DHCP only.

4.2.1 PANA-Assisted Proactive IP Address Acquisition

In case of PANA-assisted proactive IP address acquisition, the mobile node obtains an IP address proactively from a candidate target network. The mobile node makes use of PANA messages to trigger the address acquisition process on the DHCP relay agent that co-locates with PANA authentication agent in the access router in the candidate target network. Upon receiving a PANA message from the mobile node, the DHCP relay agent performs normal DHCP message exchanges to obtain the IP address from the DHCP server in the candidate target network. This address is piggy-backed in a PANA message and delivered to the client.

4.2.2 IKEv2-Assisted Proactive IP Address Acquisition

IKEv2-assisted proactive IP address acquisition works when an IPsec gateway and a DHCP relay agent are resident within each access router in the candidate target networks. In this case, the IPsec gateway and DHCP relay agent in a candidate target network help the mobile node acquire the IP address from the DHCP server in the candidate target network. The MN-AR key established during the pre-authentication phase is used as the IKEv2 pre-shared secret needed to run IKEv2 between the mobile node and the access router. The IP address from the candidate target network is obtained as part of standard IKEv2 procedure, with using the co-located DHCP relay agent for obtaining the IP address from the DHCP server in the target network using standard DHCP. The obtained IP address is sent back to the client in the IKEv2 Configuration Payload exchange. In this case, IKEv2 is also used as the tunnel management protocol for a proactive handover tunnel.

4.2.3 Proactive IP Address Acquisition Using DHCP Only

As another alternative, DHCP may be used for proactively obtaining an IP address from a candidate target network without relying on PANA or IKEv2-based approaches by allowing direct DHCP communication between the mobile node and the DHCP relay or DHCP server in the candidate target network. In this case, the mobile node sends a unicast DHCP message to the DHCP relay agent or DHCP server in the candidate target network requesting an address, with using the address associated with the current physical interface as the source address of the request.

When the message is sent to the DHCP relay agent, the DHCP relay agent relays the DHCP messages back and forth between the mobile node and the DHCP server. In the absence of a DHCP relay agent the mobile can also directly communicate with the DHCP server in the target network. The broadcast option in client's unicast DISCOVER message should be set to 0 so that the relay agent or the DHCP server can send back the reply directly to the mobile using the mobile node's source address.

In order to prevent malicious nodes from obtaining an IP address from the DHCP server, DHCP authentication should be used or the access router should install a filter to block unicast DHCP message sent to the remote DHCP server from mobile nodes that are not pre-authenticated. When DHCP authentication is used, the DHCP authentication key may be derived from the MPA-SA established between the mobile node and the authentication agent in the candidate target network.

The proactively obtained IP address is not assigned to the mobile node's physical interface until the mobile has not moved to the new network. The IP address thus obtained proactively from the target network should not be assigned to the physical interface but rather to a virtual interface of the client. Thus such a proactively acquired IP address via direct DHCP communication between the mobile node and the DHCP relay or the DHCP server in the candidate target network may be carried with additional information that is used to distinguish it from other address assigned to the physical interface.

Upon the mobile's entry to the new network, the mobile node can perform DHCP over the physical interface to the new network to get other configuration parameters such as SIP server, DNS server, etc., by using e.g., DHCP INFORM. This should not affect the ongoing communication between the mobile and correspondent host. Also, the mobile node can perform DHCP over the physical interface to the new network to extend the lease of the address that was proactively obtained before entering the new network.

In order to maintain the DHCP binding for the mobile node and keep track of the dispensed IP address before and after the secure proactive handover, the same DHCP client identifier needs to be used for the mobile node for both DHCP for proactive IP address acquisition and DHCP performed after the mobile node enters the target network. The DHCP client identifier may be the MAC address of the mobile node or some other identifier.

4.3 Address Resolution Issues 5.3.1 Proactive Duplicate Address Detection

When the DHCP server dispenses an IP address, it updates its lease table, so that this same address is not given to another client for that specific period of time. At the same time, the client also keeps a lease table locally so that it can renew when needed. In some cases where a network includes both DHCP and non-DHCP enabled clients, there is a probability that another client with the LAN may have been configured with an IP address from the DHCP address pool. In such scenario the server does a duplicate address detection based on ARP (Address Resolution Protocol) or IPv6 Neighbor Discovery before assigning the IP address. This detection procedure may take up to 4 sec to 15 sec [MAGUIRE] and will thus contribute to a larger handover delay. In case of proactive IP address acquisition process, this detection is performed ahead of time and thus does not affect the handover delay at all. By performing the duplicate address detection ahead of time, we reduce the handover delay factor.

4.3.2 Proactive Address Resolution Update

During the process of pre-configuration, the address resolution mappings needed by the mobile node to communicate with nodes in the target network after attaching to the target network can also be known, where the nodes may be the access router, authentication agent, configuration agent and correspondent node. There are several possible ways of performing such proactive address resolution.

Use an information service mechanism [NETDISC] to resolve the MAC addresses of the nodes. This might require each node in the target network to involve in the information service so that the server of the information service can construct the database of proactive address resolution.

Extend the authentication protocol used for pre-authentication or the configuration protocol used for pre-configuration to support proactive address resolution. For example, if PANA is used as the authentication protocol for pre-authentication, PANA messages may carry AVPs used for proactive address resolution. In this case, the PANA authentication agent in the target network may perform address resolution for on behalf of the mobile node.

Define a new DNS resource recode to proactively resolve the MAC addresses of the nodes in the target network. This is less desirable because the mapping between domain name and MAC address is not stable in general.

When the mobile node attaches to the target network, it installs the proactively obtained address resolution mappings without necessarily performing address resolution query for the nodes in the target network.

On the other hand, the nodes that reside in the target network and are communicating with the mobile node should also update their address resolution mappings for the mobile node as soon as the mobile node attaches to the target network. The above proactive address resolution methods could also be used for those nodes to proactively resolve the MAC address of the mobile node before the mobile node attaches to the target network. However, this is not as desirable since those nodes need to detect the attachment of the mobile node to the target network before adopting the proactively resolved address resolution mapping. A better approach would be integration of attachment detection and address resolution mapping update. This is based on gratuitously performing address resolution [RFC3344], [RFC3775] in which the mobile node sends an ARP Request or an ARP Reply in the case of IPv4 or a Neighbor Advertisement in the case of IPv6 immediately after the mobile node attaches to the new network so that the nodes in the target network can quickly update the address resolution mapping for the mobile node.

4.4 Tunnel Management

After an IP address is proactively acquired from the DHCP server in a candidate target network, a proactive handover tunnel is established between the mobile node and the access router in the candidate target network. The mobile node uses the acquired IP address as the tunnel inner address and most likely it assigns the address to a virtual interface.

The proactive handover tunnel is established using a tunnel management protocol. When IKEv2 is used for proactive IP address acquisition, IKEv2 is also used as the tunnel management protocol. Alternatively, when PANA is used for proactive IP address acquisition, PANA may be used as the secure tunnel management protocol.

Once the proactive handover tunnel is established between the mobile node and the access router in the candidate target network, the access router also needs to perform proxy address resolution on behalf of the mobile node so that it can capture any packets destined to the mobile node's new address.

Since mobile needs to be able to communicate with the correspondent node while in the previous network some or all part of binding update and data from the correspondent node to mobile node need to be sent back to the mobile node over a proactive handover tunnel. When SIP Mobility is used for the mobility management protocol, the new address as the contact address is reported to the correspondent node using SIP Re-INVITE. Once the correspondent node's SIP user agent obtains the new contact address it sends the OK to the new contact address which actually belongs to the target network. The access router in the target network picks up the OK signal as it was directed to the new contact address and tunnels it to the mobile in its previous network. Final ACK message is received from the mobile to the correspondent node. Data from the mobile to the correspondent node may not need to be tunneled in the absence of ingress filtering. After completion of the SIP Re-INVITE signaling handshake, the data from the correspondent node is sent to mobile via the proactive handover tunnel.

In order for the traffic to be directed to the mobile node after the mobile node attaches to the target network, the proactive handover tunnel needs to be deleted or disabled. The tunnel management protocol used for establishing the tunnel is used for this purpose. Alternatively, when PANA is used as the authentication protocol the tunnel deletion or disabling at the access router can be triggered by means of PANA update mechanism as soon as the mobile moves to the target network. A link-layer trigger ensures that the mobile node is indeed connected to the target network and can also be used as the trigger to delete or disable the tunnel.

4.5 Binding Update

There are several kinds of binding update mechanisms for different mobility management schemes. In some cases such as Mobile IPv4 without RO binding update is sent to home agent only, binding update is sent both to the home agent and corresponding host in case of Mobile IPv6. In case of SIP-based terminal mobility the mobile sends binding update using ReINVITE both to the registrar and correspondent host as well. Based on the distance between the mobile and the correspondent node the binding update may contribute to the handover delay. SIP-fast handover [SIPFAST] provides several ways of reducing the handover delay due to binding update. In case of secure proactive handover using SIP-based mobility management we rule out the delay due to binding update completely, as it takes place in the previous network. Thus, this scheme looks more attractive when the correspondent node is too far from the communicating mobile node.

4.6 Preventing Packet Loss

In an illustrative MPA case, we did not observe any packet loss due to IP address acquisition, secured authentication and binding update. However, there may be some transient packets during link-layer handover and until the traffic to be directed to the mobile node after attaching to the target network. Those transient packets can be lost. Bicasting or buffering the transient packets at the access router can be used to minimize or eliminate packet loss. However, bicasting does not eliminate packet loss if link-layer handover is not seamlessly performed. On the other hand, buffering does not reduce packet delay. While packet delay can be compensated by playout buffer at the receiver side for streaming application, playout buffer does not help much for interactive VoIP application which is not tolerate for large delay jitters. Thus, it is still important to optimize the link-layer handover anyway.

4.7 Link-layer Security and Mobility

Using the MPA-SA established between the mobile node and the authentication agent in a candidate target network, during the pre-authentication phase, it is possible to bootstrap link-layer security in the candidate target network while the mobile node is in the current network in the following way.

(1) The authentication agent in the candidate target network and the mobile node derives a PMK (Pair-wise Master Key) [I-D.ieff-eap-keying] using the MPA-SA that is established as a result of successful pre-authentication. Executions of EAP and a AAA protocol may be involved during pre-authentication to establish the MPA-SA. From the PMK, distinct TSKs (Transient Session Keys) [I-D.ieff-eap-keying] for the mobile node are directly or indirectly derived for each point of attachment of the candidate target network.

(2) The authentication agent may install the keys derived from the PMK and used for secure association to points of attachment. The derived keys may be TSKs or intermediary keys from which TSKs are derived.

(3) After the mobile node chooses the candidate target network as the target network and switches to a point of attachment in the target network (which now becomes the new network for the mobile node), it executes a secure association protocol such as IEEE 802.11i 4-way handshake [802.11i] using the PMK in order to establish PTKs (Pair-wise Transient Keys) and GTKs (Group Transient Keys) [I-D.ietf-eap-keying] used for protecting link-layer packets between the mobile node and the point of attachment. No additional execution of EAP authentication is needed here.

(4) While the mobile node is roaming in the new network, the mobile node only needs to perform a secure association protocol with its point of attachment point and no additional execution of EAP authentication is needed either. Integration of MPA with link-layer handover optimization mechanisms such as 802.11r can be archived this way.

The mobile node may need to know the link-layer identities of the point of attachments in the candidate target network to derive TSKs. If PANA is used as the authentication protocol for pre-authentication, this is possible by carrying Device-Id AVPs in the PANA-Bind-Request message sent from the PAA [I-D.ietf-pana-pana], with each AVP containing the BSSID of a distinct access point.

In addition to link-layer security, security for IP layer and/or higher layers can similarly be bootstrapped for the candidate network while the mobile node is still in the current network.

4.8 Authentication In Initial Network Attachment

When the mobile node initially attaches to a network, network access authentication would occur regardless of the use of MPA. The protocol used for network access authentication when MPA is used for handover optimization can be a link-layer network access authentication protocol such as IEEE 802.1X or a higher-layer network access authentication protocol such as PANA.

5. Initial Implementation and Results

We describe a specific scenario where we evaluate both MPA and non-MPA based approaches. This section describes details of one of the specific implementation for MPA and non-MPA. In addition to implementation details, this section also provides the evaluation results of optimized hand-off with MPA and compares it with non-MPA-based handover.

5.1 Network Structure

The experiment network structure is shown in FIG. 1.

There are three networks defined in the implementation environment. Network 1 is old point of attachment (oPoA), Network 2 is new point of attachment (nPoA), and network 3 is where the correspondent node (CN) resides. The mobile is initially in Network 1 and starts communicating with the correspondent node. Network 1, network 2, and network 3 do not need to be adjacent. In the illustrative implementation scenario, however, network 1, network 2 and network 3 are one hop away. In the event of mobile's movement, a specific Mobility Management Protocol (MMP) can take care of continuity of streaming traffic set up by the peer-to-peer application.

Network 1 includes DHCP Server 1, access point (AP) 1 and Access Router 1. Network 2 includes DHCP Server 2, AP 2 and Access Router 2. AP 1 and AP 2 are 802.11 wireless LAN access points. Router 2 also works as a PANA Authentication Agent (PAA) [I-D.ietf-pana-pana] and a DHCP Relay Agent [RFC3046] for Network 2, but they can be separated. DHCP relay-agent also acts like a Configuration Agent (CA) that helps obtain the IP address for the mobile proactively from the neighboring target network. Network 3 includes a Correspondent Node (CN) that communicates with the mobile node in Network 1. Both the correspondent node and mobile node are equipped with mobility enabled SIP client. Mobile SIP client is also equipped with PANA Client (PaC). In this specific case SIP proxies are not involved to set up the initial communication between the correspondent node and mobile node. Mobile Node (MN) uses 802.11 wireless LAN as the access method and can communicate via AP 1 before it moves to Network 2 where it communicates via AP 2. In this specific case, the Mobility Management Protocol (MMP) is SIP Mobility (SIP-M), configuration protocol is DHCP, authentication agent (AA) is PAA, configuration agent (CA) is DHCP Relay Agent and Access Router (AR) is Router 2 that can provide IP-in-IP tunneling [RFC1853] management functions. The MN is also equipped with IP-in-IP tunneling management function. Thus the mobile has the ability to set up a tunnel interface and detunnel the packets sent over the tunnel between the router 2 and the mobile. In this specific case, we have used IPv4, although one can as well use mobility management for IPv6 such as MIPv6 or SIP mobility over IPv6.

5.2 MPA Scenario

The communication flow for MPA in our implementation environment is described below and in FIG. 2.

Step 0: As the MN bootstraps it associates with AP 1 and obtains the IP address old Care of Address (oCoA) from the DHCP Server 1 in network 1. The MN's SIP user agent communicates with CN's SIP user agent. After a successful connection setup between the mobile and correspondent node, a voice traffic flows between the MN and the CN. This voice traffic is carried over RTP/UDP. We have used RAT (Robust Audio Tool) as the media agent.

In Step 1 (pre-authentication phase), there are some triggers to Step 1 such as AP 1's link level going down because of MN's movement. MN prepares to start the handover process and obtains the information about the required elements of the target network from an information server. Then the MN performs pre-authentication with PAA and derives the MN-CA key and MN-AR key from the MPA-SA if the pre-authentication is successful.

In Step 2 (pre-configuration phase), the MN performs pre-configuration by communicating with DHCP Proxy to obtain IP address and so forth. DHCP proxy and Authentication Agent (AA) are co-located in this case. This IP address is the new Care of Address (nCoA) the mobile would have obtained after moving to the new network. DHCP Proxy gets the IP address from DHCP Server 2. The new IP address of the mobile is relayed back to the mobile as part of its pre-authentication process. After the MN gets the new IP address (nCoA), an IP-in-IP tunnel is created between Router 2 and the mobile.

At this point the behavior of the MN and Router 2 is basically followed by [RFC1853] and the signals are cryptographically protected by using the MN-CA key.

In Step 3 (secure proactive handover main phase), once the mobile is configured with the new IP address (nCoA) on its virtual interface and a tunnel is set up between the mobile and R2, the MN sends SIP Re-invite with nCoA as its contact address to the CN. All the SIP Re-invite signaling are carried over the tunnel and so as the new RTP stream. Thus, the mobile receives the traffic in the old network even if the CN sends traffic to nCoA.

Step 4 (secure proactive handover pre-switching phase): As the mobile detects the new point of attachment and makes a decision to switch over to the new network it associates with AP 2. At this point the mobile configures itself by assigning the nCoA to its physical interface and updates the default router from the local cache that is stored during the pre-configuration phase in network 1. The MN sends a PANA-Update-Request message to the access router R2. This update message deletes the tunnel on the router R2 and deletes the tunnel locally on the mobile. Mobile's ARP entry with nCoA is also updated in the router R2 during the secure proactive handover thus reducing the delay due to ARP process that usually happens when a new node comes to a network.

EAP Pre-Authentication:

When a mobile during an active communication session moves from one access network to another access network and changes its point of attachment it is subjected to disruption in the continuity of service because of the associated handover operation. During the handover process, when the mobile changes its point-of-attachment in the network, it may change its subnet or administrative domain it is connected to.

Handover often requires authorization for acquisition or modification of resources assigned to a mobile and the authorization needs interaction with a central authority in a domain. In many cases an authorization procedure during a handover procedure follows an authentication procedure that also requires interaction with a central authority in a domain. The delay introduced due to such an authentication and authorization procedure adds to the handover latency and consequently affects the ongoing multimedia sessions.

The authentication and authorization procedure may include EAP authentication where an AAA server may be involved in EAP messaging during the handover. Depending upon the type of architecture, in some cases the AAA signals traverse all the way to the AAA server in the home domain of the mobile as well before the network service is granted to the mobile in the new network.

Real-time communication and interactive traffic such as VoIP is very sensitive to the delay. Thus it is desirable that interactions between the mobile and AAA servers must be avoided or be reduced during the handover.

EAP pre-authentication discussed in this section is mainly to deal with an environment where the mobile device and candidate authenticators are not in the same subnet or of the same link-layer technology. Such use of EAP pre-authentication would enable the mobile device to authenticate and setup keys prior to connecting to one of the candidate authenticators.

This framework has general applicability to various deployment scenarios in which proactive signaling can take effect. In other words, applicability of EAP pre-authentication is limited to the scenarios where candidate authenticators can be easily discovered, an accurate prediction of movement can be easily made. Also, the effectiveness of EAP pre-authentication may be less significant for particular inter-technology handover scenarios where simultaneous use of multiple technologies is not a major concern or where there is sufficient radio-coverage overlap among different technologies.

In EAP pre-authentication, AAA authentication and authorization for a candidate authenticator is performed while application sessions are in progress via the serving network. A goal of EAP pre-authentication is to avoid AAA signaling for EAP when or soon after the device moves.

FIG. 3 shows the functional elements that are related to EAP pre-authentication. With reference to FIG. 3, a mobile node is attached to the serving access network. Before the mobile node performs handover from the serving access network to a candidate access network, it performs EAP pre-authentication with a candidate authenticator, an authenticator in the candidate access network, via the serving access network. The mobile node may perform EAP pre-authentication with one or more candidate authenticators. It is assumed that each authenticator has an IP address when authenticators are on different IP links. It is assumed that there is at least one candidate authenticator in each candidate access network while the serving access network may or may not have a serving authenticator. The serving and candidate access networks may use different link-layer technologies.

Each authenticator has the functionality of EAP authenticator which is either standalone EAP authenticator or pass-through EAP authenticator. When an authenticator acts as a standalone EAP authenticator, it also has the functionality of EAP server. On the other hand, when an authenticator acts as a pass-through EAP authenticator, it communicates with EAP server typically implemented on a AAA server using a AAA protocol such as RADIUS and Diameter.

If the candidate authenticator is of an existing link-layer technology that uses an MSK (Master Session Key) for generating lower-layer ciphering keys, EAP pre-authentication is used for proactively generating the MSK for the candidate authenticator.

There are two scenarios on how EAP pre-authentication signaling can happen among a mobile node, a serving authenticator, a candidate authenticator and a AAA server, depending on how the serving authenticator is involved in the EAP pre-authentication signaling. No security association between the serving authenticator and the candidate authenticator is required for both pre-authentication scenarios.

The first scenario, Direct Pre-Authentication signaling, is shown in FIG. 4. In this type of pre-authentication, the serving authenticator forwards the EAP pre-authentication traffic as it would any other data traffic or there may be no serving authenticator at all in the serving access network. And, the MN communicates via MN-CA Signaling (L2 or L3).

The second scenario, Indirect Pre-Authentication signaling, is shown in FIG. 5. With indirect pre-authentication, the serving authenticator is involved in EAP pre-authentication signaling. Indirect pre-authentication is needed if, e.g., the MN cannot discover the CA's IP address or if IP communication is not allowed between the candidate authenticator and unauthorized nodes for security reasons. Indirect pre-authentication signaling is spliced into mobile node to serving authenticator signaling (MN-SA signaling) and serving authenticator to candidate authenticator signaling (SA-CA signaling). SA-CA signaling is performed over L3. MN-SA signaling is performed over L2 or L3. The role of the serving authenticator in indirect pre-authentication is to forward EAP pre-authentication signaling between the mobile node and the candidate authenticator and not to act as an EAP authenticator, while it acts as an EAP authenticator for normal authentication signaling. This is illustrated in FIG. 6.

Thus, the following functional elements can be employed in some examples: (1) a Mobile Node (MN) in which in addition to the functionalities defined in 802.21 specification, the MN has the following functionality: EAP Peer; and (2) a Point of Attachment (PoA) in which in addition to the functionalities defined in 802.21 specification, the PoA has the following functionality: EAP Authenticator; Pre-authentication Forwarding for indirect pre-authentication; and wherein the PoA acts as MIH PoS.

Media Independent Handover Services:

In I.E.E.E. P802.21/D.01.09, September 2006, entitled Draft IEEE Standard for Local and Metropolitan Area Networks: Media Independent Handover Services (the entire disclosure of which is incorporated herein by reference), among other things, the document specifies 802 media access-independent mechanisms that optimize handovers between 802 systems and cellular systems. The I.E.E.E. 802.21 standard defines extensible media access independent mechanisms that enable the optimization of handovers between heterogeneous 802 systems and may facilitate handovers between 802 systems and cellular systems.

"The scope of the IEEE 802.21 (Media Independent Handover) standard is to develop a specification that provides link layer intelligence and other related network information to upper layers to optimize handovers between heterogeneous media. This includes links specified by 3GPP, 3GPP2 and both wired and wireless media in the IEEE 802 family of standards. Note, in this document, unless otherwise noted, "media" refers to method/mode of accessing a telecommunication system (e.g. cable, radio, satellite, etc.), as opposed to sensory aspects of communication (e.g. audio, video, etc.)." See 1.1 of I.E.E.E. P802.21/D.01.09, September 2006, entitled Draft IEEE Standard for Local and Metropolitan Area Networks: Media Independent Handover Services, the entire contents of which document is incorporated herein into and as part of this patent application via being fully incorporated within PART C of the above-referenced provisional application.

The IEEE 802.21 standard is intended to facilitate a variety of handover methods. Such methods are generally classified as 'hard' or 'soft', depending on whether the handover procedure is "break before make" or "make before break" with respect to the data transport facilities that support the exchange of data packets between the mobile node and the network.

In general, handover involves cooperative use of both mobile node and network infrastructure in order to satisfy network operator and end user needs. Handover control, handover policies and other algorithms involved in handover decision making are generally handled by communication system elements which do not fall within the scope of the IEEE 802.21 standard. However, it is beneficial to describe certain aspects of the overall handover procedure so that the role and purpose of MIH Event Service, MIH Command Service, MIH Information Service and MIHF in overall handover process is clear.

General Design Principles:

The IEEE 802.21 standard is based on the following general design principles.

a) MIH Function is logical entity that helps and facilitates handover decision-making. Upper layers make handover decisions and link selection based on inputs and context from MIHF. Facilitating the recognition that a handover should take place is one of the key goals of MIHF. Discovery of information on how to make effective handover decisions is also a key component.

b) MIHF provides abstracted services to higher layers. From that perspective MIHF offers a unified interface to the upper layers. The service primitives exposed by this unified interface are based on the technology specific protocol entities of the different access networks. The MIHF communicates with the lower layers of the mobility-management protocol stack through technology-specific interfaces.

The specification of the MIHF interfaces with the lower layers generally does not fall within the scope of this standard. Such interfaces may already be specified as service access points (SAPs) within the standards that pertain to the respective access technologies, such as IEEE 802.1, IEEE 802.3, IEEE 802.11, IEEE 802.16, 3GPP and 3GPP2. This standard may contain recommendations to amend the existing access technology specific standards when modifications of the lower-layer interfaces may enable or enhance MIHF functionality.

c) Handover signaling (as part of handover execution and subsequent updates) may not be part of the standard. Different access networks support horizontal handover mechanisms (mobile initiated, network initiated, etc.). Handover initiation trigger may be useful in heterogeneous handovers when not done as per the homogeneous scheme.

d) MIHF may do further processing on MAC/PHY triggers and other related local events. Definition of this processing is outside the scope of the standard. The standard shall provide support for remote events as well. Events are advisory in nature. The decision whether to cause a handover or not based on these events is outside the scope of the standard.

e) The standard shall specify mechanisms to support MN-initiated, MN-controlled, network-initiated and network-controlled handovers.

f) The standard may support transparent inter-working with legacy equipment. Thus IEEE 802.21 compatible equipment should be able to co-exist with legacy non IEEE 802.21 compliant equipment.

Media Independent Handover Reference Framework:

The following sections describe the key and salient points with regards to communication between different MIHF entities in the client device (MN) and the network.

MIHF functions communicate with each other for various purposes. The client device (mobile node) exchanges MIH information with its MIH Point of Service. The MIHF in any Network Entity becomes an MIH PoS when it communicates directly with a MN based MIHF. An MIH Network Entity may not have a direct connection to the MN and therefore does not constitute an MIH PoS for that particular MN. The same MIH Network Entity may still act as MIH PoS for a different MN. MIHF communication may not take place on all L2 interfaces of an MIH capable MN. As an example, on an MIH capable MN with three L2 interfaces namely 802.11, 802.16, and 802.3, the 802.3 interface may be used only for system administration and maintenance operations, while the 802.11 and 802.16 interfaces may engage in the provision of MIHF services. The MN may use L2 transport for exchanging MIH information with an MIH PoS that resides in the same Network Entity as its Network PoA. The MN may use L3 transport for exchanging MIH information with an MIH PoS that may not reside in the same Network Entity as its Network PoA. The framework supports use of either L2 or L3 mechanisms toward communication among MIH network entities.

FIG. 7 shows the MIH communication model. The model shows MIHFs in different distinctive roles and the communication relationships amongst them. The communication relationship shown in FIG. 7 applies only to MIHFs. It is important to note that each of the communication relationships in the communication model does not imply a particular transport mechanism. Rather, a communication relationship only intends to show that MIHF related information passing is possible between the two distinctive MIHFs. Moreover, 1) MIHF on the MN, 2) MIH PoS on the Network Entity that includes the serving PoA of the MN, 3) MIH PoS on the Network Entity that includes a candidate PoA for the MN (a candidate PoA is a PoA that the MN is aware of but not currently attached to; it becomes the target PoA if a handover eventually occurs), 4) MIH PoS on a Network Entity that does not include a PoA for the MN, 5) MIH non-PoS on a Network Entity that does not include a PoA for the MN.

The communication model also identifies the following communication reference points between different instances of MIHFs.

1) Communication reference point R1: Reference Point R1 refers to MIHF procedures between the MIHF on the MN and the MIH PoS on the Network Entity of its serving PoA. R1 may encompass communication interfaces over both L2 and L3 and above. MIHF content passed over R1 may be related to MIIS, MIES, or MICS.

2) Communication reference point R2: Reference Point R2 refers to MIHF procedures between the MIHF on the MN and the MIH PoS on the Network Entity of a candidate PoA. R2 may encompass communication interfaces over both L2 and L3 and above. MIHF content passed over R2 may be related to MIIS, MIES, or MICS.

3) Communication reference point R3: Reference Point R3 refers to MIHF procedures between the MIHF on the MN and the MIH PoS on a non-PoA Network Entity. R3 may encompass communication interfaces over L3 and above and possibly L2 transport protocol like Ethernet bridging, MPLS, etc. MIHF content passed over R3 may be related to MIIS, MIES, or MICS.

4) Communication reference point R4: Reference Point R4 refers to MIHF procedures between an MIH PoS in a Network Entity and an MIH non-PoS instance in another Network Entity. R4 may encompass communication interfaces over L3 and above. MIHF content passed over R4 may be related to MIIS, MIES, or MICS.

5) Communication reference point R5: Reference Point R5 refers to MIHF procedures between two MIH PoS instances in distinct Network Entities. R5 may encompass communication interfaces over L3 and above. MIHF content passed over R5 may be related to MIIS, MIES, or MICS.

Illustration of the MIH Communication Model:

A network model including MIH services is shown in FIG. 8 for greater illustration of the MIH Communication Reference Points. Moving from right to left, the model includes an MIH-capable mobile node (MN, far right) that supports multiple wired and wireless access technology options. The model assumes that the provisioning service provider either operates multiple access technologies or allows its user to roam into other networks when SLA in support of inter-working has been established. The MN has an MIHF implemented, which enables it to send specific MIH queries. The MN may have the information service partially implemented internally.

The model illustrates access networks that are connected in some loose, serial way to a core network (Operator 1-3 Core). Also depicted is an access network that is more tightly inter-worked or coupled (Access Network-3) The Operator 1-3 Core each might represent a service provider, corporate intra-net provider or just another part of the visited or home access, or even core network. In this model the provisioning provider is operating Access Network-3 coupled via R1 to a core (labeled Visited/Home Core Network). The terms Visited and Home are used to indicate the provisioning service provider or enterprise. Any of the illustrated networks could be both a visited or home network depending on the relation of the operator to the provisioner of the MN.

Network providers offer MIH services in their access networks (Access Network-1 to 4) to facilitate handover into their networks. Each access technology either advertises its MIH capability or responds to MIH service discovery. Each service provider for the access network allows access to one or more MIH Points of Service (PoS, compare with Communication Model) These PoS may provide some or all of the MIH services as determined during MIH capabilities discovery. The location or node of an MIH PoS is not fixed by the standard. The PoS location may vary based on operator deployment scenario and the technology-specific MIH architecture.

An MIH PoS may reside next to or be co-located with the point of attachment (PoA) in the access network Access Network 1, 2, 4 are typical). Alternatively the PoS may reside deeper inside the access or core networks (Access Network 3 is typical). As shown in FIG. 3, the MIH entity in the MN communicates with MIH network entities either by R1, R2 or R3 over any access network. When the PoA in the serving access network has a co-located MIH function, then an R1 reference connection terminates at the PoA which is also the PoS (MN to Access Network 1, 2, 4 of the model could all be R1) In that case an R3 reference connection would be terminated at any non-PoA (also illustrated by MN to Access Networks 1, 2, 4). MIH events may originate at both sides of an active R1 link. The MN is typically the first node to react to these events.

The interaction of visited and home network could be either for control and management purposes or for data transport purposes. It is also possible that due to roaming or SLA agreements, the home network may allow the MN to access the public Internet directly through a visited network. As illustrated, two MIH network entities may communicate with each other via R4 or R5 reference connections. The MIH capable PoA may also communicate with other MIH network entities via R3 and R4 reference points. The MIH capable MN could have a MIH communication with other PoA in the candidate access networks via R2 reference point to obtain information services about the candidate network.

With regard to the MIH Information Service (MIIS) the providers offer access to their information server located in a MIH PoS node (upper far left). The operator provides the MIIS to mobile nodes so they can obtain pertinent information including but not limited to new roaming lists, costs, provider identification information, provider services, priorities and any other information that would enable to select and utilize services. As illustrated, it is possible for the mobile node to be pre-provisioned with MIIS data by its provider.

Also possible is for the mobile node to obtain MIH information services from any access network of its provider. MIIS could also be available from another overlapping or nearby network, using that network's MIIS point of service. A provisioner's network (depicted here as coupled with Access Network 3) may utilize R3 and R4 interfaces to access other MIH entities like the provisioner's or visited network's MIH information server.

With regard to the MIH Command Service (MICS), any of the Information Database may be also used as command service PoS. The MN MIHF typically communicates with this server using a layer three transport.

MIHF Services:

The MIHF provides asynchronous and synchronous services through well defined SAPs for link layers and MIH users. In the case of a system with multiple network interfaces of arbitrary type, the upper layers may use the Event service, Command service and Information service provided by MIH to manage, determine, and control the state of the underlying interfaces.

These services provided by MIH help the upper layers in maintaining service continuity, service adaptation to varying quality of service, battery life conservation, and network discovery and link selection. In a system containing heterogeneous network interfaces of 802 types and cellular 3GPP, 3GPP2 types, the Media Independent Handover Function may help the upper layers to implement effective procedures to couple services across heterogeneous network interfaces. Upper layers may utilize services provided by the MIHF across different entities to query resources required for a handover operation between heterogeneous networks.

MIH services in mobile devices facilitate seamless handover between heterogeneous networks. An MIH user such as a mobility management protocol (example Mobile IP) could be supported for handover and seamless session continuity. This shall not preclude other protocols in addition to Mobile IP and even other upper layers from making use of MIH services to optimize handovers.

Mobile nodes employing MIH services would receive indications from link layers for asynchronous operations like Event service. The interaction with Command service and Information service will be through synchronous query and response type of mechanisms. The MIHF would also provide the functionality for the exchange of information between the network and host entities of the same media type. Note, if mechanism for such information exchange already exists with a given type of media (such as with some cellular media types), the MIHF will make use of the existing mechanism whenever possible.

MIH Protocol:

The IEEE 802.21 standard supports the Media Independent Event service, Media Independent Command service and Media Independent Information service. The MIH Protocol defines the format of the messages (i.e. MIHF packet with header and payload) that are exchanged between remote MIHF entities and the transport mechanisms that support the delivery of the messages. The selection of the transport mechanism is dependent on the access technology that connects the MN to the network and the location of the MIH PoS.

The packet payload for these services may be carried over L2 management frames, L2 data frames or other higher layer protocols. Wireless networks such as 802.11 and 802.16 have a management plane and support management frames which could be suitably enhanced for carrying the above payloads. However, the wired Ethernet network does not have management plane and may carry the above payloads only in data frames.

The IEEE 802.21 standard defines the packet format and payloads in media independent manner in standard TLV format. Thereafter, these packets may be encapsulated in a L2 MIH Protocol using MIHF ethertype when the payload needs to be sent over normal data frames as in case of Ethernet. In other cases the TLV based messages and payload may be directly encapsulated in media specific management frames. Alternatively, MIH protocol messages may be encapsulated using a lower layer (L2) or a higher layer (L3 and above) transport.

The IEEE 802.21 standard defines the format of MIH Protocol data unit (PDU) header and payload. Standard TLV format provides media-independent representation for the PDU payload contents. The MIHF PDUs are encapsulated in data frames with MIHF Ethertype over 802 links. For 802.11 and 802.16 links extensions of media-specific management frames are recommended for carrying MIH messages. No assumptions are made in this standard regarding the transport of MIH messages over 3GPP and 3GPP2 access links at L2.

Illustrative Architecture:

FIG. 13 depicts some illustrative architectural components that can be employed in some illustrative and non-limiting implementations including wireless access points to which client devices communicate. In this regard, FIG. 5 shows an illustrative wireline network 20 connected to a wireless local area network (WLAN) generally designated 21. The WLAN 21 includes an access point (AP) 22 and a number of user stations 23, 24. For example, the wireline network 20 can include the Internet or a corporate data processing network. For example, the access point 22 can be a wireless router, and the user stations 23, 24 can be, e.g., portable computers, personal desk-top computers, PDAs, portable voice-over-IP telephones and/or other devices. The access point 22 has a network interface 25 linked to the wireline network 21, and a wireless transceiver in communication with the user stations 23, 24. For example, the wireless transceiver 26 can include an antenna 27 for radio or microwave frequency communication with the user stations 23, 25. The access point 22 also has a processor 28, a program memory 29, and a random access memory 31. The user station 23 has a wireless transceiver 35 including an antenna 36 for communication with the access point station 22. In a similar fashion, the user station 24 has a wireless transceiver 38 and an antenna 39 for communication to the access point 22. By way of example, in some embodiments an authenticator could be employed within such an access point (AP) and/or a supplicant or peer could be employed within a mobile node or user station.

FIG. 14 shows an illustrative computer or control unit that can be used to implement computerized process steps, to be carried out by devices, such as, e.g., an access point, an authenticator, a user station, a mobile node or another node in some embodiments. In some embodiments, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

SUMMARY

The present invention improves upon the above and/or other background technologies and/or problems therein.

The preferred embodiments of the present invention integrate media-independent handover signaling (e.g., event service, command service and information service signaling) and network access authentication signaling in a single protocol (i.e., 802.21 MIH protocol). Notably, the preferred embodiments enable such integration not merely within a single link-layer technology, but as to inter-technology handovers.

In addition, the preferred embodiments of the present invention partition a Pair-wise Master Key (PMK) into two keys (i.e., a Media-Independent PMK (MI-PMK) and a Media-Specific PMK (MS-PMK). Accordingly, in the preferred embodiments, 1) one can employ a single authenticator to serve multiple access technologies and 2) one can add more flexibility to separate authenticator for pre-authentication and authenticator for normal authentication.

In addition, the preferred embodiments of the present invention can support both indirect and direct pre-authentication. In contrast, existing pre-authentication solutions (such as, e.g., 802.11i pre-authentication and PANA pre-authentication) only support direct pre-authentication.

According to some of the preferred embodiments, the following novel features are employed: support for both direct and/or indirect pre-authentication; and/or support for both network-initiated and mobile-initiated pre-authentication.

According to some embodiments, a method for media independent handover (MIH) pre-authentication of a Mobile Node during handover from a Serving Authenticator to a Target Authenticator, comprising: integrating media-independent handover signaling and network access authentication signaling in a single protocol. In some embodiments, the single protocol involves 802.21 MIH protocol. In some embodiments, the method includes performing a network-initiated direct pre-authentication. In some embodiments, the method includes performing a mobile-initiated direct pre-authentication. In some embodiments, the method includes performing a network-initiated indirect pre-authentication. In some embodiments, the method includes performing a mobile-initiated indirect pre-authentication. In some embodiments, the method includes performing the media independent handover (MIH) pre-authentication for inter-technology handovers. In some embodiments, the method includes having an authenticator hold a Master Session Key (MSK) generated by EAP, and using the MSK for deriving the media-independent pair-wise master key (MI-PMK), and when the mobile node hands over to the target authenticator to which it has pre-authenticated, running a media-specific secure association protocol using a media-specific PMK (MS-PMK) derived from the Media-Independent PMK (MI-PMK). In some embodiments, the method includes employing a single authenticator to serve multiple access technologies.

According to some embodiments, a system for media independent handover (MIH) pre-authentication of a Mobile Node during handover from a Serving Authenticator to a Target Authenticator is provided that includes: a) an Authenticator configured to perform network access authentication of a Mobile Node and media independent handover of the Mobile Node using a single protocol, and to serve multiple access technologies; b) the Authenticator being configured to hold a master session key generated during media-specific authentication or media-independent-handover pre-authentication, which master session key is used for deriving a media-independent pair-wise master key and a media-specific pair-wise master key for running a media-specific secure association. In some embodiments, the single protocol involves 802.21 MIH protocol.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 4 is an architectural diagram depicting an illustrative EAP pre-authentication signal flow related to direct pre-authentication;

FIG. 5 is an architectural diagram depicting an illustrative EAP pre-authentication signal flow related to indirect pre-authentication;

DISCUSSION OF THE PREFERRED EMBODIMENTS

Figure 1:
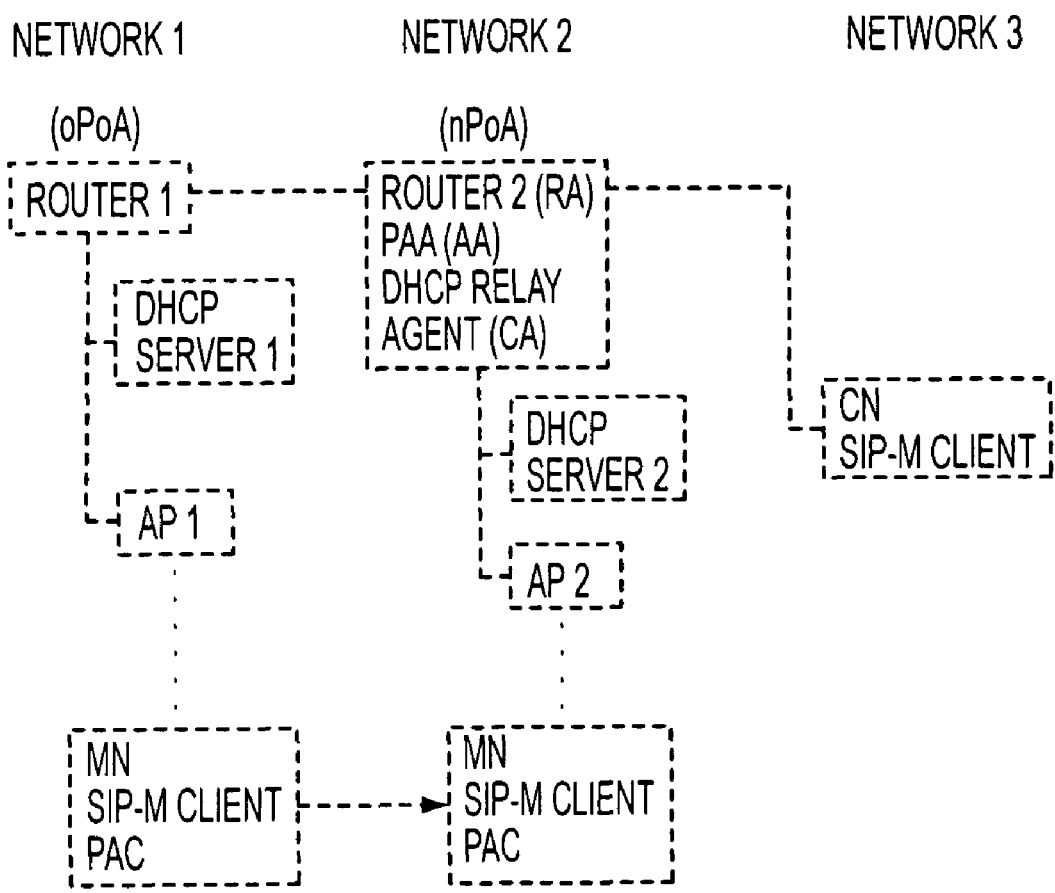
FIG. 1 is an architectural diagram depicting illustrative network structure according to some illustrative background embodiments.
Figure 2:
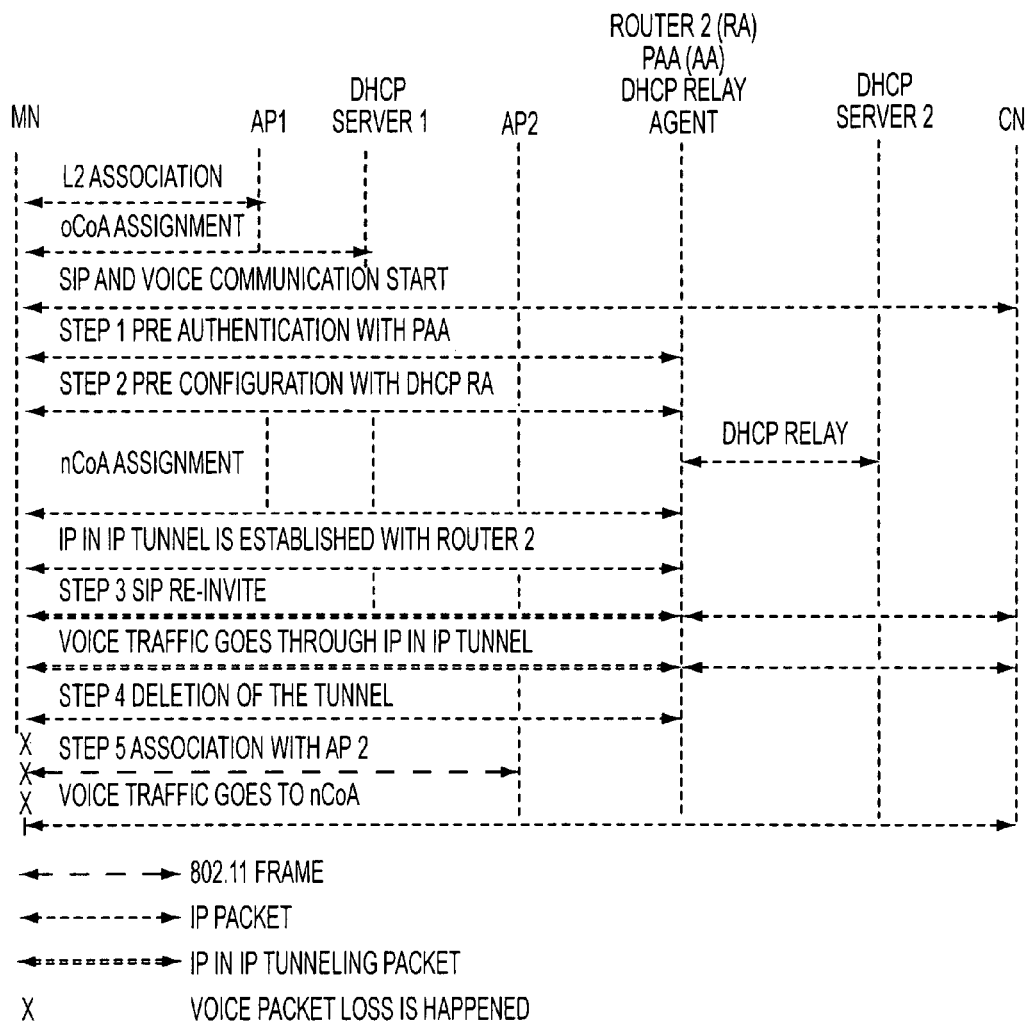
FIG. 2 is a flow diagram depicting a media-independent pre-authentication (MPA) communication flow diagram according to an illustrative background implementation environment.
Figure 3:
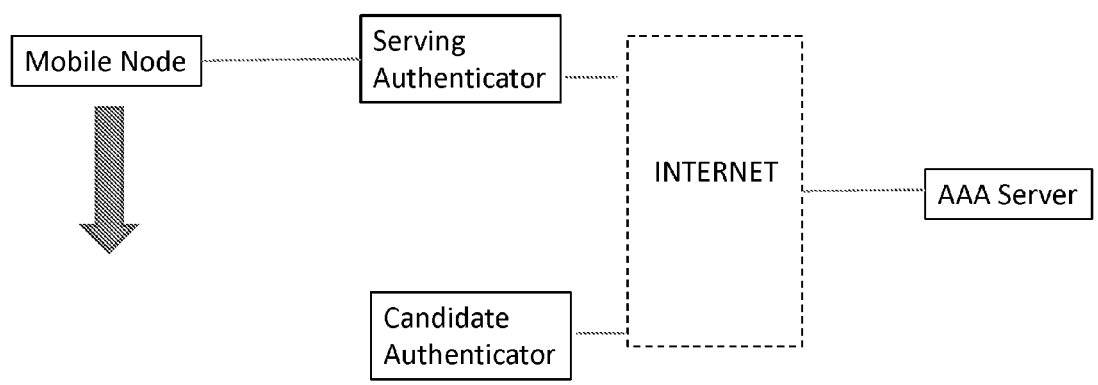
FIG. 3 is an architectural diagram depicting an illustrative EAP pre-authentication scenario.
Figure 6:
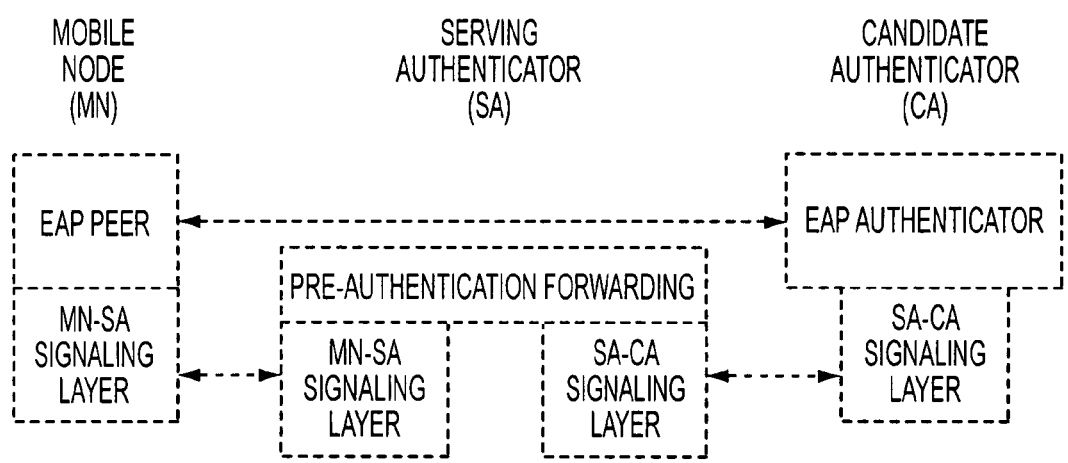
FIG. 6 is a diagram depicting the role of a serving authenticator in indirect pre-authentication.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

The preferred embodiments of the present invention integrate media-independent handover signaling (e.g., event service, command service and information service signaling) and network access authentication signaling in a single protocol (i.e., 802.21 MIH protocol). Notably, the preferred embodiments enable such integration not merely within a single link-layer technology, but as to inter-technology handovers.

In the preferred embodiments of the present invention, a Pair-wise Master Key (PMK) is partitioned into two keys (i.e., a Media-Independent PMK (MI-PMK) and a Media-Specific PMK (MS-PMK)). Accordingly, in the preferred embodiments, 1) one can employ a single authenticator to serve multiple access technologies and 2) one can add more flexibility to separate authenticator for pre-authentication and authenticator for normal authentication.

In addition, the preferred embodiments of the present invention can support both indirect and direct pre-authentication. In contrast, existing pre-authentication solutions (such as, e.g., 802.111 pre-authentication and PANA pre-authentication) only support direct pre-authentication.

According to some of the preferred embodiments, a system and method is provided that provides: support for both direct and indirect pre-authentication; and support for both network-initiated and mobile-initiated pre-authentication.

According to some preferred embodiments, the following aspects are employed.

The Authenticator is a point of service (PoS).

An MIHF-ID of MN is used as the media-independent identity of the MN.

An MIHF-ID of authenticator is used as the media-independent identity of the authenticator.

The Authenticator holds a MSK (Master Session Key) generated by EAP during media-specific authentication or MIH pre-authentication.

The MSK is used for deriving a media-independent pair-wise master key (MI-PMK).

When the MN hands over to the Target Authenticator to which it has pre-authenticated, it runs a media-specific secure association protocol using a media-specific PMK (MS-PMK) derived from MI-PMK.

The MIH acknowledgment mechanism shall be used if the MIH transport is not reliable in order to provide ordered delivery of EAP messages.

For MIH pre-authentication commands, Session-Id is used for identifying different pre-authentication sessions between the communicating MIH peers.

Here, the Session-ID is an integer assigned by an authenticator and unique within the authenticator.

The MN or the Serving Authenticator (SA) needs to know an IP address of the Candidate Authenticator (CA).

The MN performs MIH registration with the Serving Authenticator prior to running pre-authentication.

For mobile-initiated pre-authentication, the Serving Authenticator subscribes to the MN for "pre-auth initiate" event.

Figure 9:
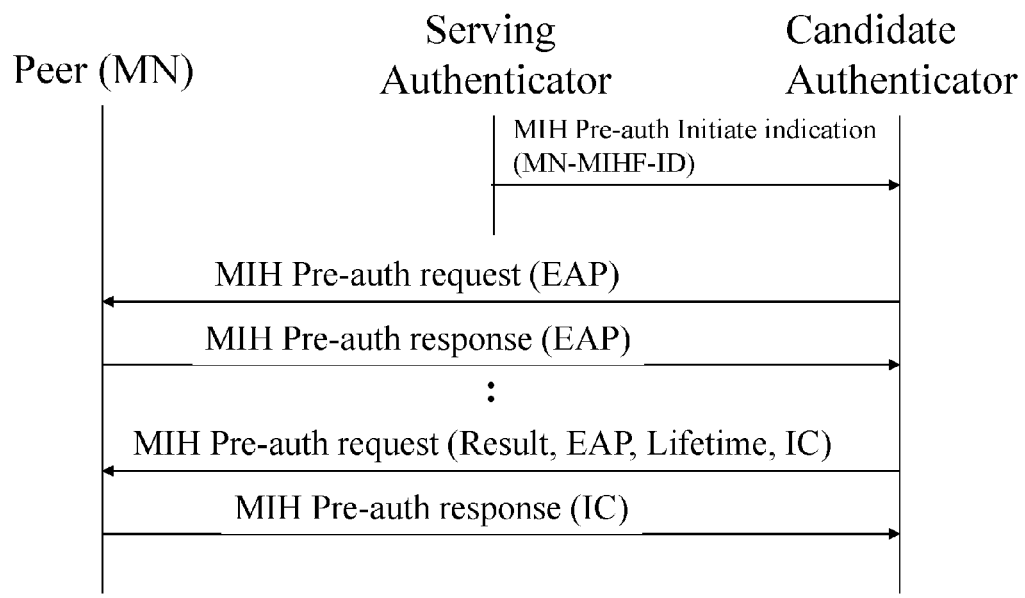
FIGS. 9 to 14 show architectural features, message call flows, and the like related to features according to some of the preferred embodiments of the present invention.

Network-Initiated Direct Pre-Authentication:

In some embodiments, network-initiated direct pre-authentication can be employed which includes features as shown in FIG. 9.

In this regard, as shown, network-initiated direct pre-authentication can involve the following functional entities: a mobile node (MN) or Peer; a Serving Authenticator (SA); and a Candidate Authenticator (CA). As shown, in the Network-initiated direct pre-authentication situation, the Serving Authenticator can initiate with an MIH Pre-auth Initiate Indication (MN-MIHF-ID) message which is transmitted to the Candidate Authenticator. In response, the Candidate Authenticator can transmit an MIH Pre-auth request (EAP) to the mobile node (MN). In response, the mobile node can transmit an MIH Pre-auth response (EAP) to the Candidate Authenticator. In response, the Candidate Authenticator can transmit an MIH Pre-auth request (Result, EAP, Lifetime, IC) to the mobile node. In response, the mobile node can transmit an MIH Pre-auth response (IC) to the Candidate Authenticator. With respect to the call flow depicted in FIG. 9, it is noted that the Source Identifier, Destination and SID are not shown in the diagram, and SID is assigned by the Candidate Authenticator.

More particularly, in the carrying out of the above message exchange, the following steps are carried out (e.g., in terms of issuing of primitives on a particular node and transmission of messages):

Step A1. An MIH User on Serving Authenticator issues an MIH_Pre-authentication_initiation.Request primitive to the MIH Function (MIHF) on the Serving Authenticator, which makes the MIHF send an MIH_Pre-authentication_Initiation indication message to Candidate Authenticator.

Step A2. When the MIHF on the Candidate Authenticator receives the MIH_Pre-authentication_Initiation indication message, it returns an MIH_Pre-authentication_initiation. Indication primitive to an MIH User on the Candidate Authenticator.

Step A3. The MIH User on the Candidate Authenticator issues an MIH_Pre-authentication. Request primitive to the MIHF on the Candiate Authenticator, which makes the MIHF send an MIH_Pre-authentication request message to the Peer.

Step A4. When the MIHF on Peer receives the MIH_Pre-authentication request message, it returns an MIH_Pre-authentication. Indication primitive to an MIH User on the Peer.

Step A5. The MIH User on the Peer issues an MIH_Pre-authentication. Response primitive to the MIHF on the Peer, which makes the MIHF send an MIH_Pre-authentication response message to the Candiate Authenticator.

Step A6. When the MIHF on the Candidate Authenticator receives the MIH_Pre-authentication response message, it returns an MIH_Pre-authentication.Confirm primitive to the MIH User on the Candidate Authenticator.

Thereafter, Steps A3 to A6 are repeated until completion of EAP authentication.

Figure 10:
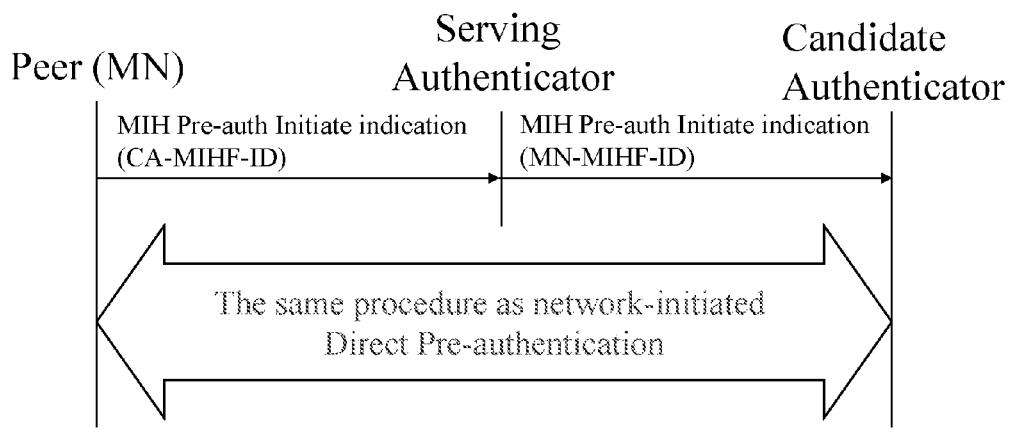

Mobile-Initiated Direct Pre-Authentication:

In some embodiments, mobile-initiated direct pre-authentication can be employed which includes features as shown in FIG. 10.

Figure 7:
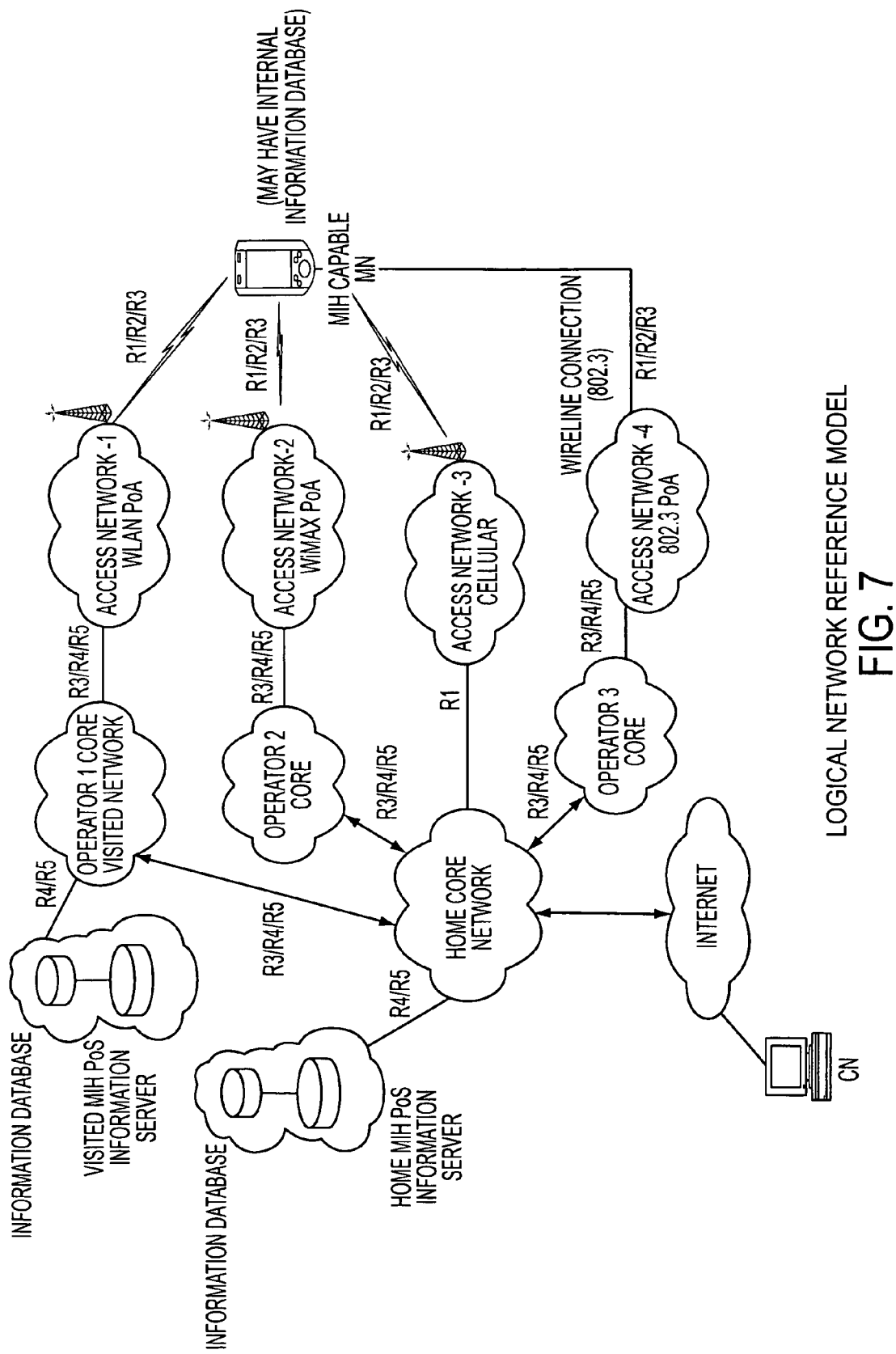
FIG. 7 depicts a network reference model related to media independent handover (MIH)
Figure 8:
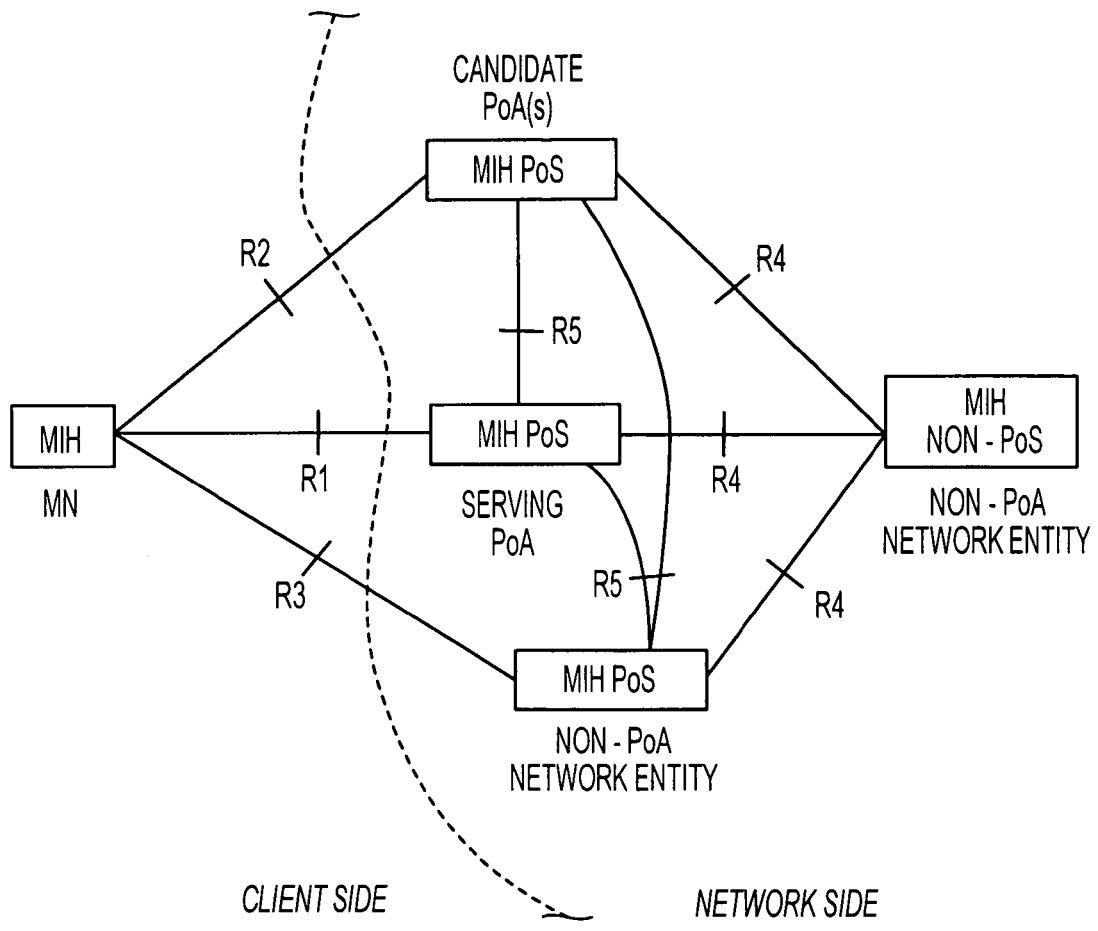
FIG. 8 depicts and MIHF communication model.

In this regard, as shown, mobile-initiated direct pre-authentication can similarly involve the following functional entities: a mobile node (MN) or Peer; a Serving Authenticator (SA); and a Candidate Authenticator (CA). As shown, in the mobile-initiated direct pre-authentication situation, the mobile node initiates with an MIH Pre-auth initiate indication message (CA-MIHF-ID) transmitted to the Serving Authenticator. Next, the Serving Authenticator transmits an MIH Pre-auth Initiate indication (MN-MIHF-ID) to the Candidate Authenticator. Thereafter, as depicted in FIG. 8, the procedure is continued in the same manner as the procedure depicted in FIG. 7 related to the network-initiated direct pre-authentication (i.e., following the transmission of the MN-MIHF-ID). With respect to the call flow depicted in FIG. 10, it is noted that the Source Identifier, Destination Identifier and SID are not shown in the diagram.

More particularly, in the carrying out of the above message exchange, the following steps are carried out (e.g., in terms of issuing of primitives on a particular node and transmission of messages):

Step B1. An MIH User on Peer issues an MIH_Pre-authentication_initiation. Request primitive to the MIHF on the Peer, which makes the MIHF send an MIH_Pre-authentication_Initiation indication message to Serving Authenticator.

Step B2. When the MIHF on the Serving Authenticator receives the MIH_Pre-authentication_Initiation indication message, it returns an MIH_Pre-authentication_initiation. Indication primitive to an MIH User on the Serving Authenticator.

Step B3. The MIH User on the Serving Authenticator issues an MIH_Pre-authentication_Initiation indication primitive to the MIHF on the Serving Authenticator, which makes the MIHF send an MIH_Pre-authentication_Initiation indication message to the Candidate Authenticator.

Thereafter, Step A2 and subsequent steps in FIG. 9 will be taken.

Figure 11:
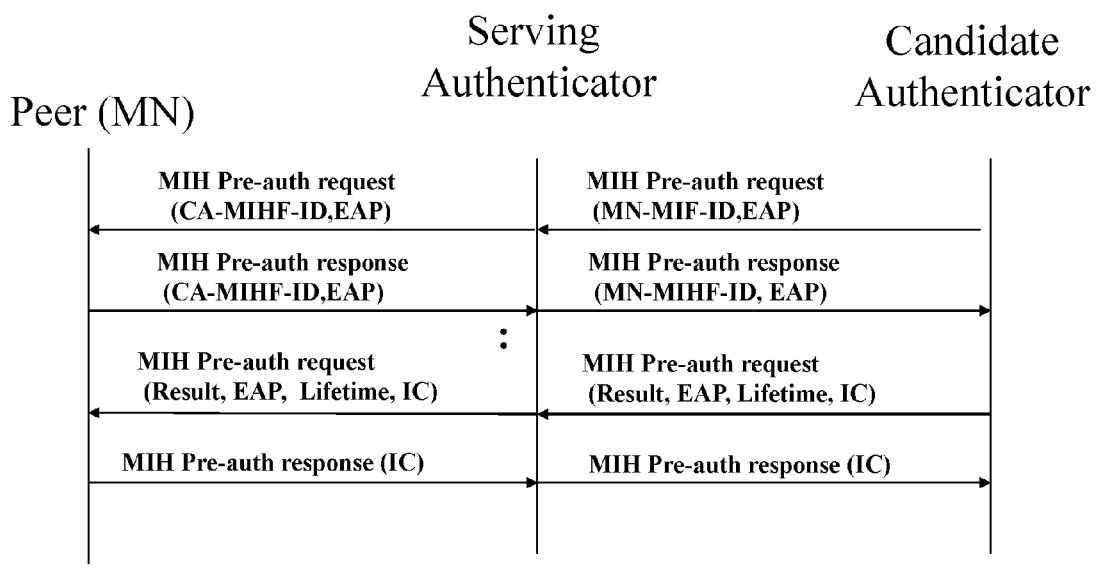

Network-Initiated Indirect Pre-Authentication:

In some embodiments, network-initiated indirect pre-authentication can be employed which includes features as shown in FIG. 11.

In this regard, as shown, network-initiated indirect pre-authentication can involve the following functional entities: a mobile node (MN) or Peer; a Serving Authenticator (SA); and a Candidate Authenticator (CA). As shown, in the Network-initiated indirect pre-authentication situation, the Candidate Authenticator can transmit an MIH Pre-auth request (MN-MIF-ID, EAP) to the Serving Authenticator. Then, the Serving Authenticator can transmit an MIH Pre-Auth request (CA-MIHF-ID, EAP) to the mobile node (MN). Then, the mobile node can transmit an MIH Pre-auth response (CA-MIHF-ID, EAP) to the Serving Authenticator. Then, the Serving Authenticator can transmit an MIH Pre-auth response (MN-MIHF-ID, EAP) to the Candidate Authenticator. Then, the Candidate Authenticator can transmit an MIH Pre-auth request (Result, EAP, Lifetime, IC) to the Serving Authenticator. Then, the Serving Authenticator can transmit an MIH Pre-auth request (Result, EAP, Lifetime, IC) to the mobile node. Then, the mobile node can transmit the MIH Pre-auth response (IC) to the Serving Authenticator. And, the Serving Authenticator can transmit the MIH Pre-auth response (IC) to the Candidate Authenticator. With respect to the call flow depicted in FIG. 11, it is noted that the Source Identifier, Destination Identifier and SID are not shown in the diagram. The SID is assigned by the Serving Authenticator for messages between the mobile node and the Serving Authenticator and by the Candidate Authenticator for messages between the Serving Authenticator and the Candidate Authenticator.

More particularly, in the carrying out of the above message exchange, the following steps are carried out (e.g., in terms of issuing of primitives on a particular node and transmission of messages):

Step C1. The MIH User on the Candidate Authenticator issues an MIH_Pre-authentication.Request primitive to the MIHF on the Candidate Authenticator, which makes the MIHF send an MIH_Pre-authentication request message to the Serving Authenticator.

Step C2. When the MIHF on the Serving Authenticator receives the MIH_Pre-authentication request message, it returns an MIH_Pre-authentication. Indication primitive to an MIH User on the Serving Authenticator.

Step C3. The MIH User on the Serving Authenticator issues an MIH_Pre-authentication.Request primitive to the MIHF on the Serving Authenticator, which makes the MIHF send an MIH_Pre-authentication request message to the Peer.

Step C4. When the MIHF on the Peer receives the MIH_Pre-authentication request message, it returns an MIH_Pre-authentication. Indication primitive to an MIH User on the Peer.

Step C5. The MIH User on the Peer issues an MIH_Pre-authentication. Response primitive to the MIHF on the Peer, which makes the MIHF send an MIH_Pre-authentication response message to the Serving Authenticator.

Step C6. When the MIHF on the Serving Authenticator receives the MIH_Pre-authentication response message, it returns an MIH_Pre-authentication.Confirm primitive to the MIH User on the Serving Authenticator.

Step C7. The MIH User on the Serving Authenticator issues an MIH_Pre-authentication. Response primitive to the MIHF on the Serving Authenticator, which makes the MIHF send an MIH_Pre-authentication response message to the Candidate Authenticator.

Step C8. When the MIHF on the Candidate Authenticator receives the MIH_Pre-authentication response message, it returns an MIH_Pre-authentication.Confirm primitive to the MIH User on the Candidate Authenticator.

Thereafter, Steps C1 to C8 are repeated until completion of EAP authentication.

Figure 12:
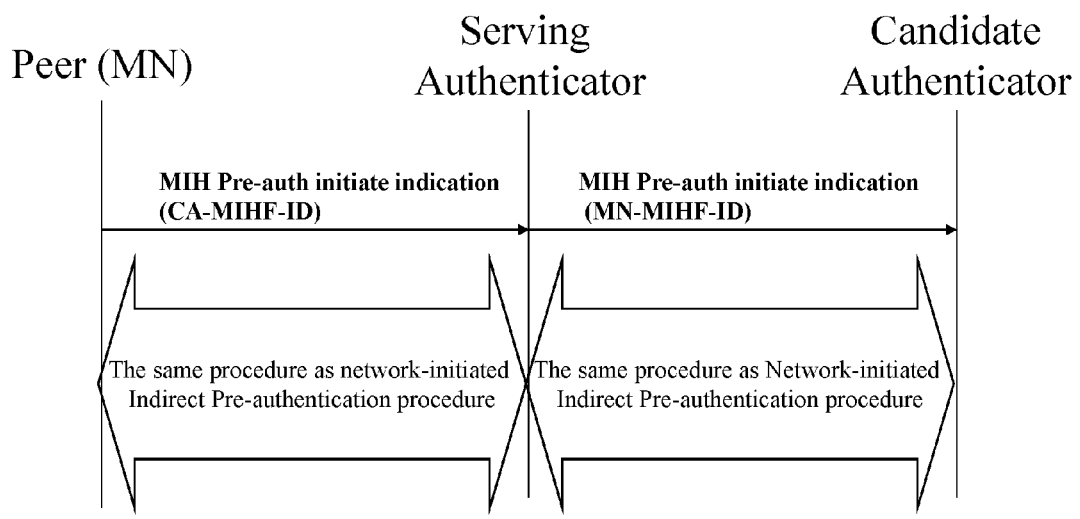

Mobile-Initiated Indirect Pre-Authentication:

In some embodiments, mobile-initiated indirect pre-authentication can be employed which includes features as shown in FIG. 12.

In this regard, as shown, mobile-initiated indirect pre-authentication can involve the following functional entities: a mobile node (MN) or Peer; a Serving Authenticator (SA); and a Candidate Authenticator (CA). As shown, in the mobile-initiated indirect pre-authentication, the mobile node can transmit an MIH Pre-auth initiate indication (CA-MIHF-ID) to the Serving Authenticator. Then, the serving authenticator can transmit an MIH Pre-auth initiate indication (MN-MIHF-ID) to the Candidate Authenticator. Thereafter, as depicted in FIG. 12, the procedure is continued in the same manner as the procedure depicted in FIG. 11 related to the network-initiated indirect pre-authentication (i.e., in relation to communications between both the mobile node and the Serving Authenticator and between the Serving Authenticator and the Candidate Authenticator). With respect to the call flow depicted in FIG. 12, it is noted that the Source Identifier, Destination Identifier and SID are not shown in the diagram.

More particularly, in the carrying out of the above message exchange, the following steps are carried out (e.g., in terms of issuing of primitives on a particular node and transmission of messages):

Step D1. An MIH User on Peer issues an MIH_Pre-authentication_initiation. Request primitive to the MIHF on the Peer, which makes the MIHF send an MIH_Pre-authentication_Initiation indication message to Serving Authenticator.

Step D2. When the MIHF on the Serving Authenticator receives the MIH_Pre-authentication_Initiation indication message, it returns an MIH_Pre-authentication_initiation.Indication primitive to an MIH User on the Serving Authenticator.

Step D3. The MIH User on the Serving Authenticator issues an MIH_Pre-authentication_Initiation indication primitive to the MIHF on the Serving Authenticator, which makes the MIHF send an MIH_Pre-authentication_Initiation indication message to the Candidate Authenticator.

Step D4. When the MIHF on the Candidate Authenticator receives the MIH_Pre-authentication_Initiation indication message, it returns an MIH_Pre-authentication_initiation.Indication primitive to an MIH User on the Candidate Authenticator.

Thereafter, Step C1 and subsequent steps in FIG. 11 will be taken.

Figure 13:
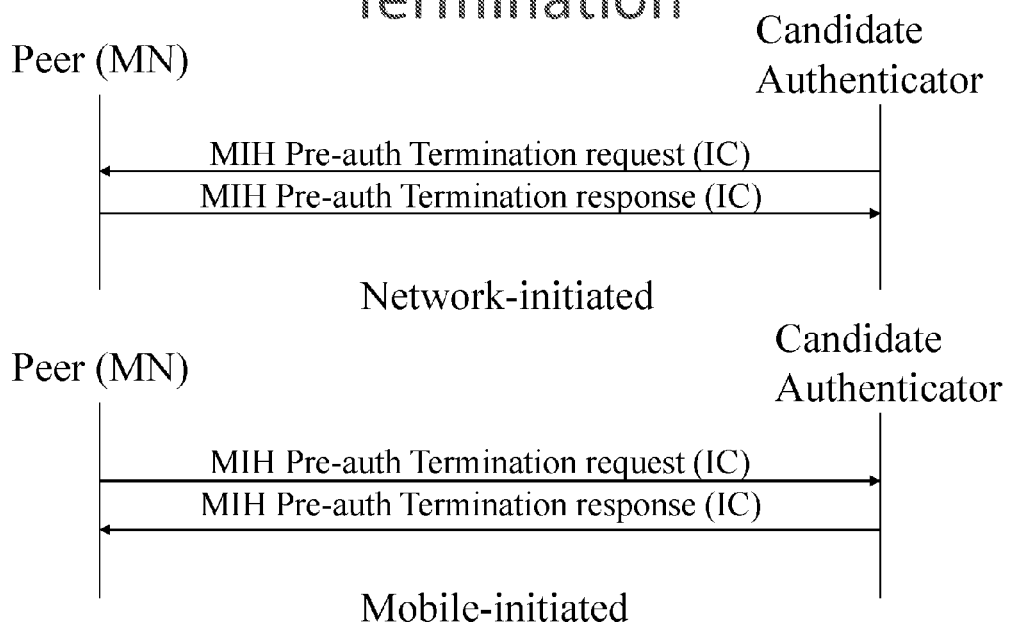

Direct Pre-Authentication Termination:

In some embodiments, direct pre-authentication termination can be employed which includes features as shown in FIG. 13. In this regard, FIG. 13 shows both a network-initiated method and a mobile-initiated method.

With respect to the network-initiated method, as shown, the Candidate Authenticator can transmit an MIH Pre-auth Termination request (IC) to the mobile node. And, the mobile node can transmit an MIH Pre-auth Termination response (IC) to the Candidate Authenticator.

With respect to the mobile-initiated method, as shown, the mobile node can transmit an MIH Pre-auth Termination request (IC) to the Candidate Authenticator. And, the Candidate Authenticator can transmit an MIH Pre-auth Termination response (IC) to the mobile node.

With respect to the call flow depicted in FIG. 13, it is noted that the Source Identifier, Destination Identifier and SID are not shown in the diagram.

More particularly, in the carrying out of the above message exchange, the following steps are carried out (e.g., in terms of issuing of primitives on a particular node and transmission of messages):

1. Network Initiated Direct-Preauth Termination:

Step E1. The MIH User on the Candidate Authenticator issues an MIH_Pre-authentication_Termination.Request primitive to the MIHF on the Candiate Authenticator, which makes the MIHF send an MIH_Pre-authentication_Termination request message to the Peer.

Step E2. When the MIHF on Peer receives the MIH_Pre-authentication_Termination request message, it returns an MIH_Pre-authentication_Termination.Indication primitive to an MIH User on the Peer.

Step E3. The MIH User on the Peer issues an MIH_Pre-authentication_Termination.Responseprimitive to the MIHF on the Peer, which makes the MIHF send an MIH_Pre-authentication_Termination response message to the Candiate Authenticator.

Step E4. When the MIHF on the Candidate Authenticator receives the MIH_Pre-authentication_Termination response message, it returns an MIH_Pre-authentication_Termination.Confirm primitive to the MIH User on the Candidate Authenticator.

2. Mobile Initiated Direct-Preauth Termination:

In this regard, the Candidate Authenticator and Peer functions in each step for Network Initiated Direct-Preauth Termination are swapped in Mobile Initiated Direct-Preauth Termination as follows.

Step E1. The MIH User on the Peer issues an MIH_Pre-authentication_Termination.Request primitive to the MIHF on the Peer, which makes the MIHF send an MIH_Pre-authentication_Termination request message to the Candidate Authenticator.

Step E2. When the MIHF on Candidate Authenticator receives the MIH_Pre-authentication_Termination request message, it returns an MIH_Pre-authentication_Termination.Indication primitive to an MIH User on the Candidate Authenticator.

Step E3. The MIH User on the Candidate Authenticator issues an MIH_Pre-authentication_Termination.Response primitive to the MIHF on the Candidate Authenticator, which makes the MIHF send an MIH_Pre-authentication_Termination response message to the Peer.

Step E4. When the MIHF on the Peer receives the MIH_Pre-authentication_Termination response message, it returns an MIH_Pre-authentication_Termination.Confirm primitive to the MIH User on the Peer.

Figure 14:
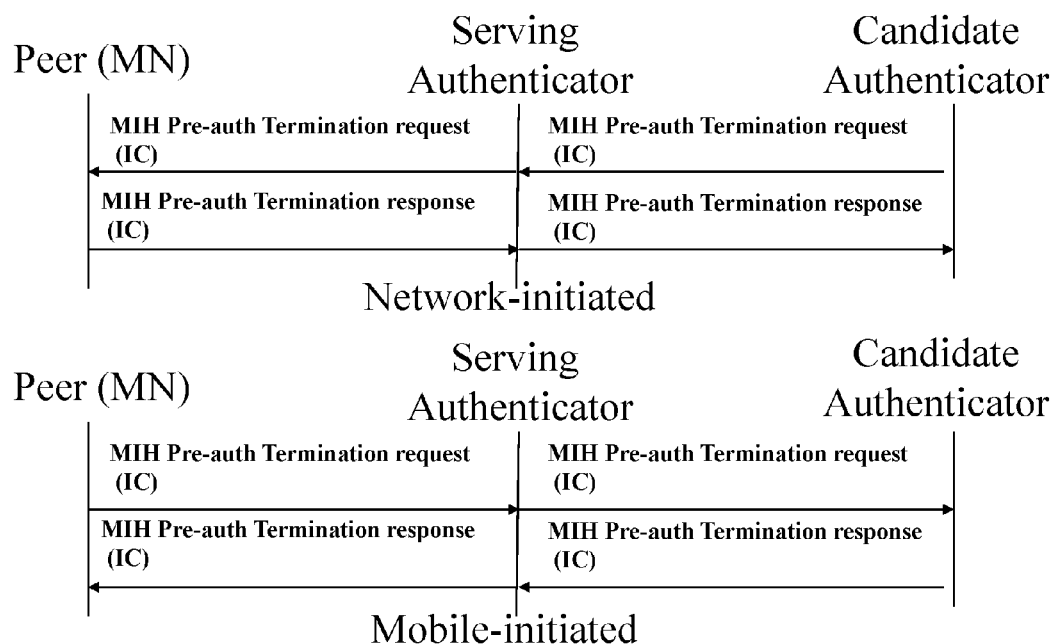
Figure 15:
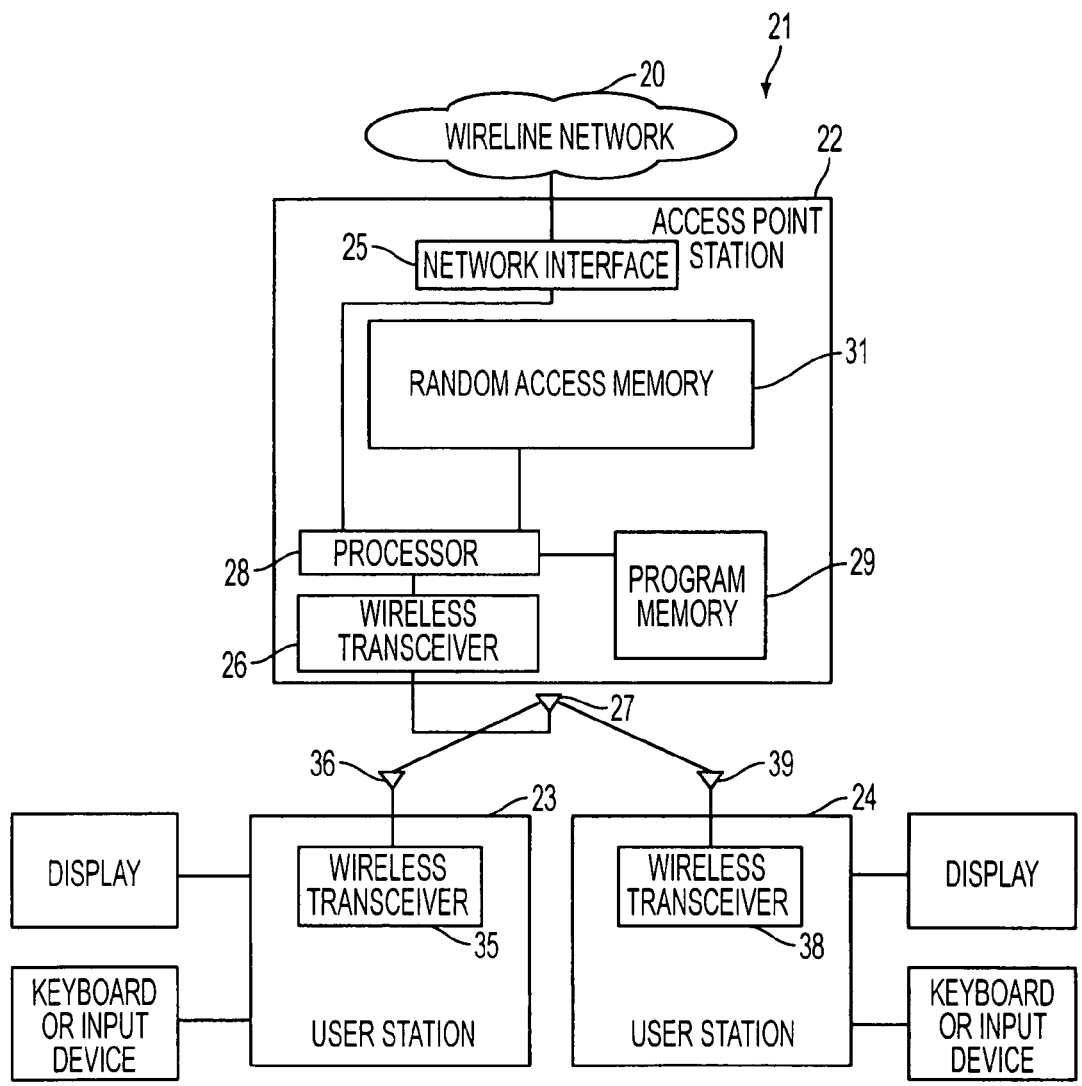
FIG. 15 is an illustrative architectural diagram demonstrating illustrative components of system architecture according to some examples.
Figure 16:
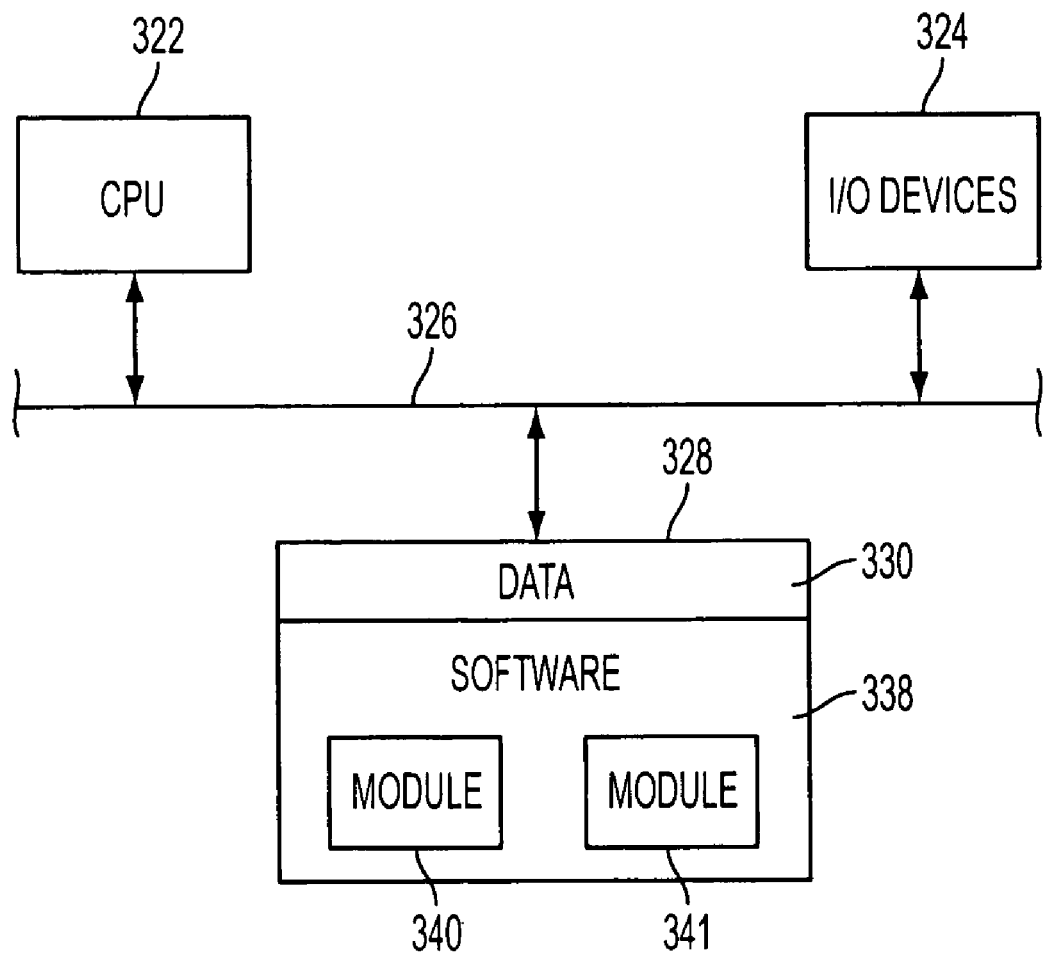
FIG. 16 shows features according to an illustrative computer or control unit that can be used to implement computerized process steps, to be carried out by devices, such as, e.g., an access point, a user station, a source node or destination node in some embodiments.

Indirect Pre-Authentication Termination:

In some embodiments, indirect pre-authentication termination can be employed which includes features as shown in FIG. 14. In this regard, FIG. 14 shows both a network-initiated method and a mobile-initiated method.

With respect to the network-initiated method, as shown, the Candidate Authenticator can transmit an MIH Pre-auth Termination request (IC) to the Serving Authenticator, and the Serving Authenticator can transmit an MIH Pre-auth Termination request (IC) to the mobile node. Then, the mobile node can transmit an MIH Pre-auth Termination response (IC) to the Serving Authenticator, and the Serving Authenticator can transmit an MIH Pre-auth Termination response (IC) to the Candidate Authenticator.

With respect to the mobile-initiated method, as shown, the mobile node can transmit an MIH Pre-auth Termination request (IC) to the Serving Authenticator, and the Serving Authenticator can transmit an MIH Pre-auth Termination request (IC) to the Candidate Authenticator. Then, the Candidate Authenticator can transmit an MIH Pre-auth Termination response (IC) to the to the Serving Authenticator, and the Serving Authenticator can transmit an MIH Pre-auth Termination response (IC) to the mobile node.

With respect to the call flow depicted in FIG. 14, it is noted that the Source Identifier, Destination Identifier and SID are not shown in the diagram.

More particularly, in the carrying out of the above message exchange, the following steps are carried out (e.g., in terms of issuing of primitives on a particular node and transmission of messages):

1. Network Initiated Indirect-Preauth Termination:

Step F1. The MIH User on the Candidate Authenticator issues an MIH_Pre-authentication_Termination.Request primitive to the MIHF on the Candiate Authenticator, which makes the MIHF send an MIH_Pre-authentication_Termination request message to the Serving Authenticator.

Step F2. When the MIHF on Serving Authenticator receives the MIH_Pre-authentication_Termination request message, it returns an MIH_Pre-authentication_Termination-.Indication primitive to an MIH User on the Serving Authenticator.

Step F3. The MIH User on the Serving Authenticator issues an MIH_Pre-authentication_Termination.Request primitive to the MIHF on the Serving Authenticator, which makes the MIHF send an MIH_Pre-authentication_Termination request message to the Peer.

Step F4. The MIH User on the Peer issues an MIH_Pre-authentication_Termination.Response primitive to the MIHF on the Peer, which makes the MIHF send an MIH_Pre-authentication_Termination response message to the Serving Authenticator.

Step F5. When the MIHF on the Serving Authenticator receives the MIH_Pre-authentication_Termination response message, it returns an MIH_Pre-authentication_Termination. Confirm primitive to the MIH User on the Serving Authenticator.

Step F6. The MIH User on the Serving Authenticator issues an MIH_Pre-authentication_Termination.Response primitive to the MIHF on the Serving Authenticator, which makes the MIHF send an MIH_Pre-authentication_Termination response message to the Candidate Authenticator.

Step F7. When the MIHF on the Candidate Authenticator receives the MIH_Pre-authentication_Termination response message, it returns an MIH_Pre-authentication_Termination. Confirm primitive to the MIH User on the Candidate Authenticator.

2. Mobile Initiated Indirect-Preauth Termination:

In this regard, the Candidate Authenticator and Peer functions in each step for Network Initiated Indirect-Preauth Termination are swapped in Mobile Initiated Indirect-Preauth Termination.

Step F1. The MIH User on the Peer issues an MIH_Pre-authentication_Termination.Request primitive to the MIHF on the Peer, which makes the MIHF send an MIH_Pre-authentication_Termination request message to the Serving Authenticator.

Step F2. When the MIHF on Serving Authenticator receives the MIH_Pre-authentication_Termination request message, it returns an MIH_Pre-authentication_Termination-.Indication primitive to an MIH User on the Serving Authenticator.

Step F3. The MIH User on the Serving Authenticator issues an MIH_Pre-authentication_Termination.Request primitive to the MIHF on the Serving Authenticator, which makes the MIHF send an MIH_Pre-authentication_Termination request message to the Candidate Authenticator.

Step F4. The MIH User on the Candidate Authenticator issues an MIH_Pre-authentication_Termination.Response primitive to the MIHF on the Candidate Authenticator, which makes the MIHF send an MIH_Pre-authentication_Termination response message to the Serving Authenticator.

Step F5. When the MIHF on the Serving Authenticator receives the MIH_Pre-authentication_Termination response message, it returns an MIH_Pre-authentication_Termination-.Confirm primitive to the MIH User on the Serving Authenticator.

Step F6. The MIH User on the Serving Authenticator issues an MIH_Pre-authentication_Termination.Response primitive to the MIHF on the Serving Authenticator, which makes the MIHF send an MIH_Pre-authentication_Termination response message to the Peer.

Step F7. When the MIHF on the Peer receives the MIH_Pre-authentication_Termination response message, it returns an MIH_Pre-authentication_Termination.Confirm primitive to the MIH User on the Peer.

Pre-Authentication Remote Primitives:

In some preferred embodiments, primitives corresponding to the functionality shown in FIGS. 9-14 above can include features as set forth in the following paragraphs. In this regard, primitives involve, e.g., conceptual representations of functions that can be called across protocol layers within the same communication node—such as, e.g., being called from upper layers to trigger a message exchange.

1. Pre-Authentication Remote Event Primitives:

MIH_Pre-Authentication_initiation.{Request,Indication}.

In some embodiments, such primitives can be employed in which the following parameters are used:

Source Identifier: MIHF-ID of MN or CA.
Destination Identifier: MIHF-ID of SA or CA.
SID: Session ID.
MN-MIHF-ID: MIHF-ID of MN (if different from Source Identifier).
CA-MIHF-ID: MIHF-ID of CA (if different from Destination Identifier).

2. Pre-Authentication Remote Command Primitives:

MIH_Pre-Authentication.{Request,Indication}.

In some embodiments, such primitives can be employed in which the following parameters are used:

Source Identifier: MIHF-ID of MN or SA.
Destination Identifier: MIHF-ID of SA or CA.
SID: Session ID.
Result: {Success, Failure}: Contained only when the request primitive is issued by CA and EAP authentication is completed.
EAP: EAP message.
MN-MIHF-ID: MIHF-ID of MN (if different from Source identifier or before a Session-Id is assigned).
CA-MIHF-ID: MIHF-ID of CA (if different from Destination Identifier).
Lifetime: Lifetime of pre-authentication session.
IC (Integrity Checksum).

3. Pre-Authentication Remote Command:

MIH_Pre-Authentication_{Response,Confirm}

In some embodiments, in this regard, the following parameters are employed:

Source Identifier: MIHF-ID of CA or SA.
Destination Identifier: MIHF-ID of MN or SA.
SID: Session ID.
EAP: EAP message.

IC (Integrity Checksum).

4. Pre-Authentication Remote Command:

MIH_Pre-authentication_Termination_{Request,Indication}

In some embodiments, in this regard, the following parameters are employed:

Source Identifier: MIHF-ID of MN, CA or SA.
Destination Identifier: MIHF-ID of MN, CA or SA.
SID: Session ID.
IC (Integrity Checksum).

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims (e.g., including that to be later added) are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for media independent handover (MIH) pre-authentication of a Mobile Node during handover from a Serving Authenticator to a Target Authenticator, comprising:
   integrating media-independent handover signaling and network access authentication signaling in a single protocol;
   deriving a Media-Independent PMK (MI-PMK) and a Media-Specific PMK (MS-PMK);
   having an authenticator hold a Master Session Key (MSK) generated by EAP, and using said MSK for deriving the media-independent pair-wise master key (MI-PMK), and when the mobile node hands over to the target authenticator to which it has pre-authenticated, running a media-specific secure association protocol using a media-specific PMK (MS-PMK) derived from the Media-Independent PMK (MI-PMK).

2. The method of claim 1, wherein said single protocol involves 802.21 MIH protocol.

3. The method of claim 1, further including performing a network-initiated direct pre-authentication.

4. The method of claim 3, wherein said performing a network-initiated direct pre-authentication, includes transmitting from a Serving Authenticator an MIH Pre-auth Initiate indication message to a Candidate Authenticator, transmitting from the Candidate Authenticator an MIH Pre-auth request message to a Mobile Node, and transmitting from the Mobile Node an MIH Pre-auth response message to the Candidate Authenticator.

5. The method of claim 1, further including performing a mobile-initiated direct pre-authentication.

6. The method of claim 5, wherein said performing a mobile-initiated direct pre-authentication, includes having a Mobile Node transmit an MIH Pre-auth Initiate indication to a Serving Authenticator, and having the Serving Authenticator transmit an MIH Pre-auth Initiate indication message to the Candidate Authenticator.

7. The method of claim 1, further including performing a network-initiated indirect pre-authentication.

8. The method of claim 7, wherein said performing a network-initiated indirect pre-authentication includes having a Candidate Authenticator transmit an MIH Pre-auth request message to the Serving Authenticator, and having the Serving Authenticator transmit an MIH Pre-auth request message to a Mobile Node.

9. The method of claim 1, further including performing a mobile-initiated indirect pre-authentication.

10. The method of claim 9, wherein said performing a mobile-initiated indirect pre-authentication includes having a Mobile Node transmit an MIH Pre-auth initiate indication message to a Serving Authenticator, and having the Serving Authenticator transmit an MIH Pre-auth initiate indication to a Candidate Authenticator.

11. The method of claim 1, further including performing said media independent handover (MIH) pre-authentication for inter-technology handovers.

12. The method of claim 1, further including employing a single authenticator to serve multiple access technologies.

13. The method of claim 1, further including performing MIH registration of the Mobile Node with the Serving Authenticator prior to running pre-authentication.

14. The method of claim 1, further including performing a mobile-initiated pre-authentication, and having a Serving Authenticator subscribe to the Mobile Node for a pre-auth initiate event.

15. A method for media independent handover (MIH) pre-authentication of a Mobile Node during handover from a Serving Authenticator to a Target Authenticator, comprising: having an authenticator hold a Master Session Key (MSK) an Extensible Authenticated Protocol (EAP), and using said MSK for deriving the media-independent pair-wise master key (MI-PMK), and when the mobile node hands over to the Target Authenticator to which the mobile node has pre-authenticated, running a media-specific secure association protocol using a media-specific PMK (MS-PMK) derived from the Media-Independent PMK (MI-PMK).

16. The method of claim 15, further including integrating media-independent handover signaling and network access authentication signaling in a single protocol.

17. The method of claim 16, wherein said single protocol involves 802.21 MIH protocol.

18. The method of claim 15, further including performing said media independent handover (MIH) pre-authentication for inter-technology handovers.

19. The method of claim 18, further including employing a single authenticator to serve multiple access technologies.

20. A system for media independent handover (MIH) pre-authentication of a Mobile Node during handover from a Serving Authenticator to a Target Authenticator, comprising:
 a) an Authenticator configured to perform network access authentication of a Mobile Node and media independent handover of the Mobile Node using a single protocol, and to serve multiple access technologies;
 b) said Authenticator being configured to hold a master session key generated during media-specific authentication or media-independent-handover pre-authentication, which master session key is used for deriving a media-independent pair-wise master key and a media-specific pair-wise master key for running a media-specific secure association.

21. The system of claim 20, wherein said single protocol involves 802.21 MIH protocol.

* * * * *

UNITED STATES PATENT AND TRADEMARK OFFICE
CERTIFICATE OF CORRECTION

| | | |
|---|---|---|
| PATENT NO. | : 8,036,176 B2 | Page 1 of 2 |
| APPLICATION NO. | : 12/135194 | |
| DATED | : October 11, 2011 | |
| INVENTOR(S) | : Oba et al. | |

It is certified that error appears in the above-identified patent and that said Letters Patent is hereby corrected as shown below:

In the Specification

In Column 4, Lines 22-23, delete "[I-D.ieff-mobileip-lowlatency-handoffs-v4]." and insert -- [I-D.ietf-mobileip-lowlatency-handoffs-v4]. --, therefor.

In Column 4, Line 33, delete "[I-D.ieff-seamoby-ctp]." and insert -- [I-D.ietf-seamoby-ctp]. --, therefor.

In Column 4, Line 35, delete "draft-ieff-eap-keying-04" and insert -- draft-ietf-eap-keying-04 --, therefor.

In Column 4, Line 59, delete "draft-ieff-mobike-design-01" and insert -- draft-ietf-mobike-design-01 --, therefor.

In Column 5, Line 33, delete "[I-D.ieff-mobileip-reg-tunnel]." and insert -- [I-D.ietf-mobileip-reg-tunnel]. --, therefor.

In Column 6, Line 33, delete "[I-D.ieff-mobike-design]" and insert -- [I-D.ietf-mobike-design] --, therefor.

In Column 6, Line 59, delete "[I-D.ieff-seamoby-ctp]" and insert -- [I-D.ietf-seamoby-ctp] --, therefor.

In Column 7, Line 21, delete "802.111" and insert -- 802.11i --, therefor.

In Column 15, Line 59, delete "[I-D.ieff-eap-keying]" and insert -- [I-D.ietf-eap-keying] --, therefor.

In Column 15, Line 63, delete "[I-D.ieff-eap-keying]" and insert -- [I-D.ietf-eap-keying] --, therefor.

In Column 25, Line 1, delete "wireline network 21," and insert -- wireline network 20, --, therefor.

Signed and Sealed this
Twentieth Day of January, 2015

Michelle K. Lee
*Deputy Director of the United States Patent and Trademark Office*

CERTIFICATE OF CORRECTION (continued)
U.S. Pat. No. 8,036,176 B2

In Column 28, Line 1, delete "802.111" and insert -- 802.11i --, therefor.

In the Claims

In Column 36, Line 52, in Claim 15, delete "(MSK) an" and insert -- (MSK) generated by an --, therefor.